(12) United States Patent
Thompson et al.

(10) Patent No.: US 8,042,991 B2
(45) Date of Patent: Oct. 25, 2011

(54) DISPENSER WITH DYNAMIC MIXER FOR TWO-PART COMPOSITIONS

(75) Inventors: Richard T Thompson, Haddam, CT (US); Edward K Welch, II, Naples, FL (US)

(73) Assignee: Tylerville Technologies LLC, Haddam, CT (US)

( * ) Notice: Subject to any disclaimer, the term of this patent is extended or adjusted under 35 U.S.C. 154(b) by 0 days.

(21) Appl. No.: 13/084,998

(22) Filed: Apr. 12, 2011

(65) Prior Publication Data

US 2011/0186598 A1    Aug. 4, 2011

Related U.S. Application Data

(62) Division of application No. 11/977,247, filed on Oct. 24, 2007, now Pat. No. 7,963,690.

(60) Provisional application No. 60/854,490, filed on Nov. 28, 2006.

(51) Int. Cl.
*B01F 11/00* (2006.01)
*B31C 1/00* (2006.01)
(52) U.S. Cl. ......... 366/275; 366/241; 493/269; 493/283
(58) Field of Classification Search .......... 366/275, 366/241; 493/269, 287
See application file for complete search history.

(56) References Cited

U.S. PATENT DOCUMENTS 3,460,809 A * 8/1969 Hauss ............... 366/338
3,656,716 A * 4/1972 Ljungerg et al. ......... 366/76.1
* cited by examiner

*Primary Examiner* — Walter Griffin
*Assistant Examiner* — Christopher Vandeusen
(74) *Attorney, Agent, or Firm* — Edward K. Welch, II; IP & L Solutions

(57) ABSTRACT

Novel dispenser means are provided for mixing and dispensing two-part curable compositions wherein the mixer elements are isolated from the curable components.

23 Claims, 8 Drawing Sheets

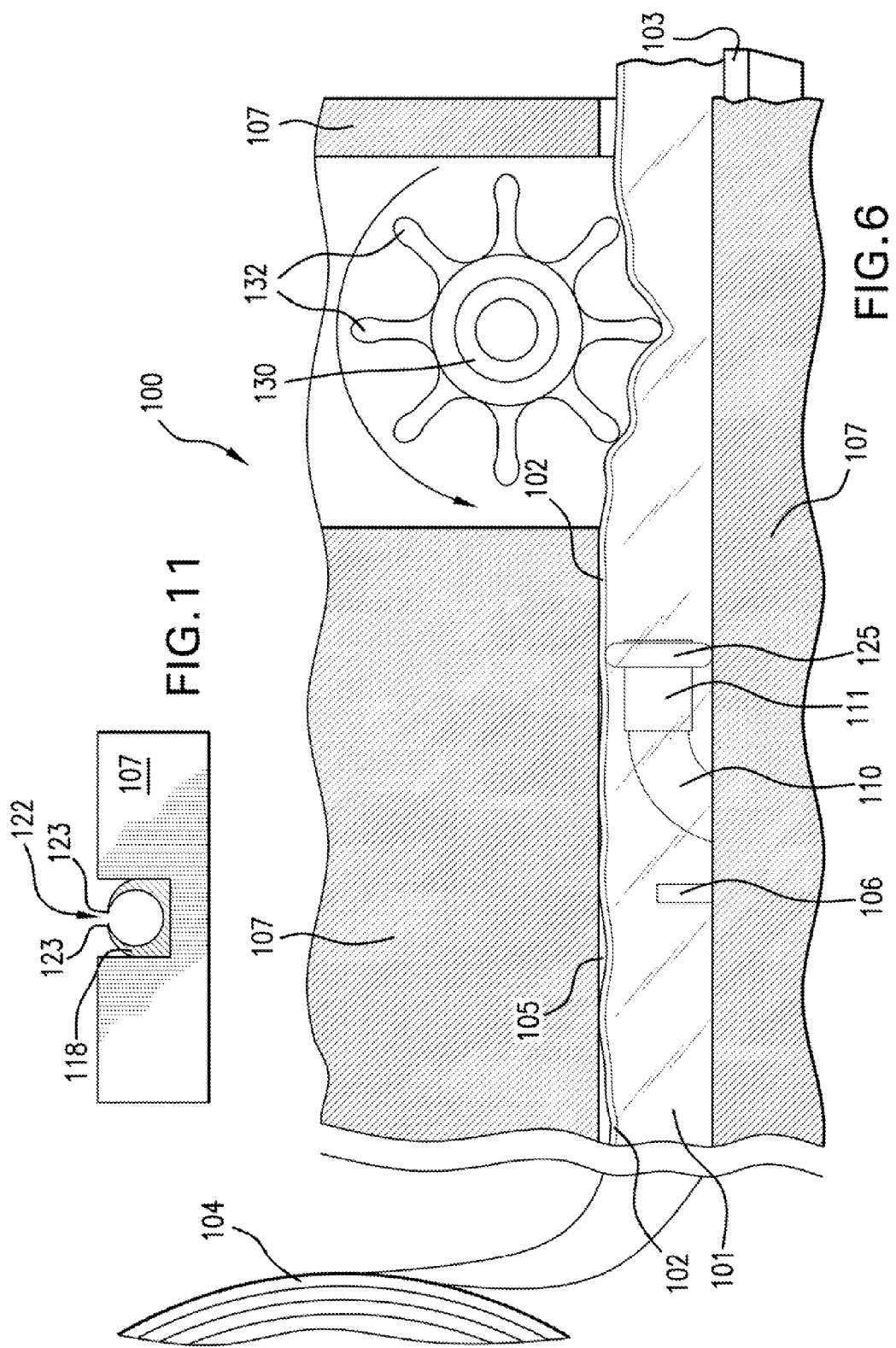

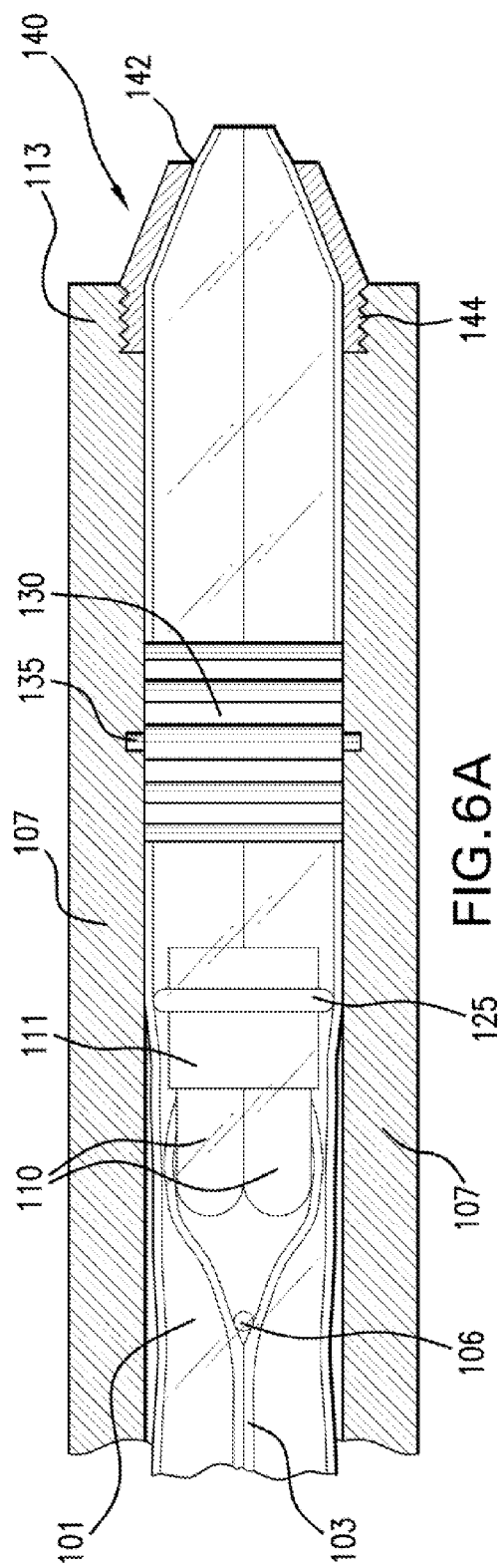
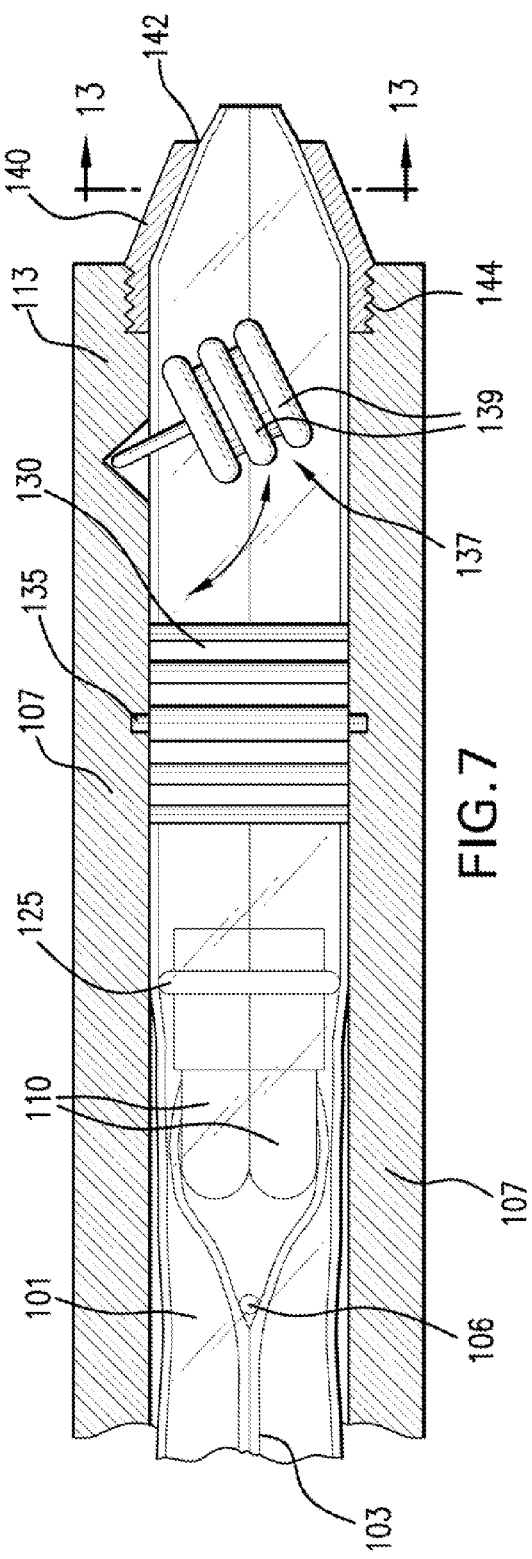

DISPENSER WITH DYNAMIC MIXER FOR TWO-PART COMPOSITIONS

This application is a divisional application of U.S. Ser. No. 11/977,247, filed Oct. 24, 2007, issued as U.S. Pat. No. 7,963,690, which claims the benefit of U.S. Provisional Patent Application No. 60/854,490 filed on Nov. 28, 2006 entitled Dispenser with Dynamic Mixer for Two-Part Compositions.

BACKGROUND OF THE INVENTION

1. Field of the Invention

The present invention relates to dispensers of two-part compositions having incorporated therein mixing means wherein the flow path of the combined two-part composition within and through the mixing means is readily removable and replaceable.

2. Description of Related Art

Reactive two-part compositions have many applications ranging from general molding compositions to specialized applications such as adhesives, sealants, coatings and potting compounds. Their uses vary from high and low tech industrial production and assembly operations to relatively low-tech consumer applications. They find particular use in OEM manufacture as well in the service sector for general maintenance and repair.

Reactive two-part compositions are of many different formulations and chemistries and include true thermosetting polymers and other curable or settable compositions as well as reactive compositions that show marked increase in viscosity, but do not necessarily solidify. They are most generally characterized as curing/reacting, i.e., undergoing a chemical reaction of components, upon intimate contact of one component of the curable composition with another. Exemplary reactive two-part compositions include those based on polyester, epoxy, acrylic or urethane chemistry. Besides the physical properties and performance characteristics of the cured materials, one of the critical aspects of reactive two-part compositions is their cure speed. All of these aspects play a key role in where and how these materials are used. While physical properties and performance characteristics are, to a large extent, dictated by the chemistry of the polymer or polymerizable component, other additives, if present, such as catalysts, accelerators, and initiators, and their level of incorporation, also affect cure speed, which, in turn, can affect physical properties and performance characteristics. Another important, and oftentimes critical, factor regarding the use of two- or more-part systems is the proper apportionment of the parts as they are being combined. Generally, while these systems offer excellent engineering properties and performance characteristics, their very nature, notably their viscosity and especially their cure speed, can lead to difficulties in mixing, uniformity of cure and properties, and application processes.

For a reactive two-part system of a given chemistry and formulation, optimal performance and cure speed are oftentimes contingent upon careful and intimate mixing of the two parts. Even though polymerization and/or cross-linking of certain two-part curable systems may be self-propagating, i.e., once kicked off the polymerization or cure will continue through the volume of the curable composition, intimate mixing of the component will provide optimal cure speed and avoid stress problems that may arise as a result of too fast a cure in one section of the volume as opposed to another. More importantly, though, those compositions that rely upon the co-polymerization and/or cross-linking of two or more monomers require a substantially homogeneous mixture of the co-monomers in order to ensure good overall cure and performance. The failure to provide such an intimate distribution of the copolymerizable components will result in areas of uncured monomer or co-monomer or of areas having lower than expected, or needed, cross-linking. Similarly, in those curable systems reliant upon curatives including catalysts, cure accelerators, cure initiators and the like, especially those wherein propagation of cure is limited, non-existent or too slow, an even distribution of such curatives in the monomer(s) is important for uniform cure, good cure speed and good performance properties of the cured material. Otherwise one may find areas of poorly cured or uncured materials as well as stresses within the cured materials, especially at the interface of the two regions.

Since cure, and hence viscosity buildup, begins once the necessary reactive components are brought into contact with one another, cure speed then becomes of key concern. At some point in time the viscosity of the formulated composition increases to such an extent and/or the degree of cure that has been attained is so high that the material is no longer capable of being applied or used for its intended purpose. The period from when the materials are first mixed to that point where they are essentially no longer suitable for use is typically defined as its pot life. The slower the cure speed of the system, the longer the pot life and the more time one has to ensure good intimate mixing as well as to apply the activated system to its intended end use. However, a slow reacting system will also take longer to reach the desired cured properties. This may be acceptable for some applications, but for many industrial applications, especially automated bonding, sealing, winding (e.g., filament winding) or potting applications, rapid cure is desirable to speed assembly and improve productivity. Conversely, too fast of a cure speed and little time is available to ensure good mixing, let alone a sufficiently manageable pot life to allow for adequate working of the treated substrates. In some cases, the pot life of these systems may be a minute or two, perhaps even fractions of a minute. While manual mixing and application of these materials may be suitable for a consumer or commercial repair service, it is totally impractical in a production situation—there just isn't enough time.

Thus, industrial and commercial use of reactive two-part compositions requires a delicate balancing of a number of parameters, not just formulation-wise, but also methodology and equipment-wise. The latter, e.g., two-part dispensers and/or mixers, has played a key role in the advancement of the use of such compositions in industrial and commercial applications. Similarly, the importance and versatility of use of these reactive two-part compositions for industrial manufacture and repair/servicing applications has led to many developments in suitable dispensing and mixing equipment. For example, the effective use of these materials has required the development of so called "meter-mix-dispense" systems that automate and control the measuring of the two components, their mixing and application to the part. The entire process can be accomplished within a few seconds.

While these systems have proven effective, some difficulties remain. Although the concern with pot life limitation is greatly diminished by the overall quickness of the mixing and dispensing of the newer apparatus, it doesn't fully go away. Specifically, even though these devices successfully expel most of the curable composition, a thin layer tends to cling to the internal components of the mixer or reside in areas of low or no flow. Because the material is reactive, it will cure in place. As time passes, the layer of cured material builds up and begins to thicken and restrict the flow of uncured material through the dispenser and mixer apparatus. This problem is made worse by the periodic stoppage of the operation of the dispenser and mixer during the daily production cycle, for example, as may occur during breaks, line alterations, line disruptions, line maintenance, etc. Here, since newly mixed material is not there to essentially sweep the wetted surface of the older material, buildup appears to increase even faster. Eventually, the adverse impact on the flow and throughput of the dispenser will necessitate a complete shutdown of the production line while the dispenser is disassembled and cleaned before the line is restarted. In extreme circumstances, the mixture may cure through the volume in the dispenser rendering it useless: thereby necessitating a more difficult cleaning or, worse, outright disposal of the dispenser.

Although most dispensers can be cleaned for re-use, cleaning is labor intensive and usually requires solvents: the latter raising a number of environmental, health and safety concerns. Thus, it may be expedient to simply discard the used mixers on a regular basis and start over with a new one. In this light, single use packaging having distinct compartments containing pre-metered amounts of the components wherein a manipulation of the packaging allows for an intimate mixing of the two components as well as the dispensing thereof helps overcome some of these difficulties while rendering their use nearly fool-proof. However, such single use packaging is all but impractical for high volume, high speed assembly or manufacturing operations, especially automated operations.

One type of mixer often used with two-part compositions is referred to a "static mixer tube" or "Kenics" mixer—after their original manufacturer Kenics Corporation (McCray, U.S. Pat. No. 2,125,245). The tube contains a series of helical elements that divide the stream of material in two and reorient it by 90 degrees before it enters the next element. With each additional element, the number of times the stream is divided and remixed goes up by a power of two. Studies have shown good mixing for this design provided that a large enough number of elements are used. The original static mixers were fabricated from metal and designed for use in the chemical processing industry. However, the design lends itself to low cost fabrication by plastic injection molding where the molded plastic mixers are used once and then discarded.

While popular for many applications, static mixer tubes have a number of limitations. One limitation is that while higher numbers of elements provide superior mixing performance, they also increase the cost of the mixer and increase the flow resistance within the dispenser/mixer apparatus. The many small elements in the tube also make the static mixer tube prone to clogging once any of the material inside begins to thicken. Although plastic molded static mixer tubes are low in purchased cost, the additional costs of labor and lost production time in constantly changing them out must be considered as these costs have a significant impact on the overall process cost.

A second type of mixer suitable for use in a meter-mix-dispense process is the dynamic mixer. These devices are characterized by the use of a mechanically driven element, such as a rotor or impeller blade, an auger, etc., to directly and actively mix the components. There are a number of designs available for use with a wide range of two-part compositions. Specific selection is dependent upon the materials, the application or dispensing process as well as the product viscosities to be encountered by the apparatus.

While extremely effective in mixing performance, the surfaces of the moving elements of the dynamic mixer in contact with the reactive components become covered with hardened material and eventually the device must be disassembled for cleaning. Unlike static mixer tubes, dynamic mixers are costly to manufacture and cannot be economically discarded after use. Furthermore, they are more suited for batch-type processing applications as opposed to continuous processing, especially as may be desired or needed for industrial manufacturing applications, particularly automated operations.

Thus, there remains a need for an apparatus for mixing and dispensing reactive two-part curable compositions which operates in a continuous fashion and in which concern of cure on the surface of the reaction chamber and associated components of the dispenser and mixer device is minimized.

Further, there remains a need for an apparatus for mixing and dispensing reactive two-part curable compositions wherein deposits or buildup of cured material within the apparatus can be removed and/or cleaned with minimal disruption on the operation of the dispenser apparatus.

SUMMARY OF THE INVENTION

The present invention relates to dispensers of reactive multi-part curable compositions having incorporated therein mixing means wherein the flow path of the combined multi-part composition within and through the dispenser, including the mixing means, is isolated from the mixer means. Specifically, the reactive multi-part composition is isolated from the elements of the mixer means by use of a disposable, flexible polymer tube that defines the flow path of the combined elements through the mixer means to the outlet of the dispenser.

In its most basic of elements, the dispenser of the present invention comprises a) a manifold for individually channeling each of the components of a two- or more-part curable composition into a disposable and flexible reaction tube, b) the disposable and flexible reaction tube in which the components of the curable composition are brought into contact with one another, and c) a mixer means which acts upon the walls of the reaction tube in such as way as to facilitate or directly affect the intermixing of the components of the curable composition. At a minimum, the disposable and flexible reaction tube extends from the manifold through the mixer means and ends with an orifice through which the curable composition is expelled or dispensed.

In addition to the foregoing, the dispenser of the present invention may comprise a number of other elements or the aforementioned elements may have integrated therein or associated therewith other elements that aid in or enhance the performance of the dispenser. For example, the dispenser may include a plurality of valve means for controlling the flow of the components of the curable composition into or through the manifold, a dispenser body comprising one or more components which create a support for the reaction tube and define its path through the dispenser, and a nozzle element having a dispenser orifice of a given size and shape for help in controlling the size, shape and placement of the mass of dispensed material.

The dispenser of the present invention is capable of use with low and high viscosity materials, as well as curable compositions having relatively short pot lives. Such versatility is enabled by the broad selection of mixing means suitable for incorporation into the dispenser as well as the adjustability and control of the flow speed, whether regulated by the mixer means, the force or pressure with which the components are fed from the manifold into the reaction tube or both.

BRIEF DESCRIPTION OF THE DRAWINGS

FIG. 6 is a partial, side view, largely cut away, of a dispenser employing a formed-in-place reaction tube together with an impeller wheel mixer means.

FIG. 6A is a partial, top view, largely cut away, of a portion of the dispenser of FIG. 6.

FIG. 7 is a partial, top view, largely cut away, of a dispenser similar to that of FIG. 6 with the addition of a roller mixer means.

FIG. 11 is cross-sectional view of a second embodiment of the portion of the dispenser barrel of FIG. 9.

DETAILED DESCRIPTION

Figure 1:
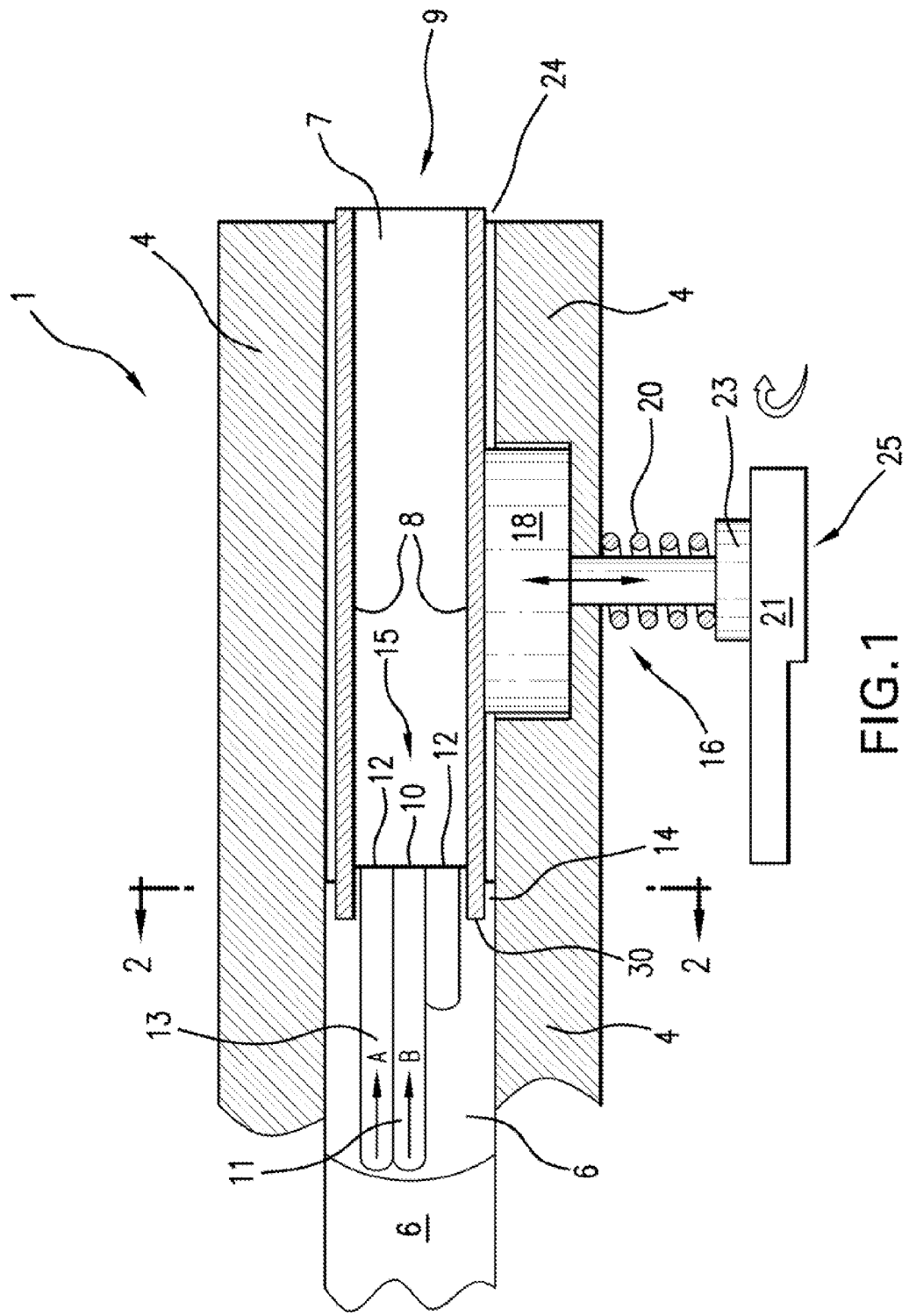
FIG. 1 is a partial, side view, largely cut away and in section, of a dispenser employing a single-use, disposable reaction tube and a single plunger-type mixer element.

For ease of discussion, the materials to be processed through the inventive dispenser of the present application will be referred to as "curable"compositions, materials or components; however, it is to be understood that the concept of "curable" includes those compositions that fully cure, set, cross-link or copolymerize as well as those that do so only partially. For example, relative to the latter, the reactive components may merely experience a substantial increase in viscosity or they may form gels and the like, with no further cure, polymerization, cross-linking or the like and/or where full cure, setting and the like results from a secondary cure mechanism. Additionally, while the discussion is mostly focused on two-part systems, it is to be understood that three and more part systems could also be employed in the dispensers of the present invention.

The present invention is directed to novel dispenser means for use in intimately mixing and dispensing multi-component curable compositions which dispenser means includes a reaction tube, as defined below, that isolates the interior surfaces of the dispenser, especially those components of the dispenser means that facilitate or bring about the intimate mixing of the components of the curable composition, from the curable composition itself. The dispenser means may exist in several different configurations or embodiments depending upon the physical nature and chemical make-up of the curable composition to be dispensed, whether the dispenser means is to be employed in a stand-alone relationship or integrated into a larger apparatus, whether it is to be hand-held or robotically held, whether it will be used intermittently or continuously, etc. In one respect, the dispenser means may integrate a single use, pre-formed, pre-cut, replaceable reaction tube or it may integrate a continuous or substantially continuous preformed or formed-in-place reaction tube. In another respect, the dispenser may incorporate a number of different means for achieving an intimate mixture or mixing of the components of the curable composition. Preferably, the mixing means are dynamic mixing means that "directly" act upon the curable composition, creating torsional or shear flow within the curable composition and causing the intimate mixing of the components thereof without physically contacting the curable composition. Instead, the action of the mixer is transferred to the curable composition through the wall of the reaction tube.

The dispenser may also incorporate or have associated therewith certain valve means for stopping and starting the flow of the curable components through the dispenser as well as nozzle means for enabling better precision with respect to the dispensing of the intimately mixed and reactive curable composition. However, the key element common to all embodiments of the dispenser means of the present invention is the presence of the flexible, polymeric reaction tube that isolates the curable composition from the operating components of the dispenser, defines the flow-path of the combined components of the curable composition through the dispenser, and also serves as the reaction chamber in which the components are intimately mixed. As noted above, this polymeric tube, hereinafter referred to as the "reaction tube" for the sake of simplicity, may be a single use, pre-formed tube or a continuous use, formed-in-place or pre-formed tube.

In its most simple construction, the dispenser of the present invention comprises a) a manifold for channeling the components of a curable composition into a disposable and flexible reaction tube, b) the disposable and flexible reaction tube in which the components of the curable composition are brought into contact with one another, and c) a mixer means which acts upon the walls of the reaction tube in such as way as to intermix the components of the curable composition, said dispenser having a flow axis corresponding to the general flow of the curable composition through the manifold and the reaction tube. The reaction tube may take a number of different configurations and types, as described more fully below, and is in a leak-tight relationship with the manifold for ensuring that the flow of the curable composition is from the manifold to and through the dispenser outlet. While the dispenser may be used with compositions having three, four, or more parts, for simplicity, its construction and use will be described relative to a two-part curable composition.

The manifold comprises a body having an aft region comprising a plurality of inlets, at least one for each component to be mixed; a fore region comprising a plurality of outlets, at least one for each component to be introduced into the reaction tube; and a central region defined by a plurality of flow paths through the manifold body from the inlets to the corresponding outlets. The manifold body may take any number of shapes and configurations, depending in part, upon the type of reaction tube to be associated therewith. For convenience, the manifold body will be described herein as being generally cylindrical in shape having a fore face, an aft face and a sidewall: the fore face corresponding to the terminus of the fore region and the aft face being the terminus of the aft region.

Figure 4:
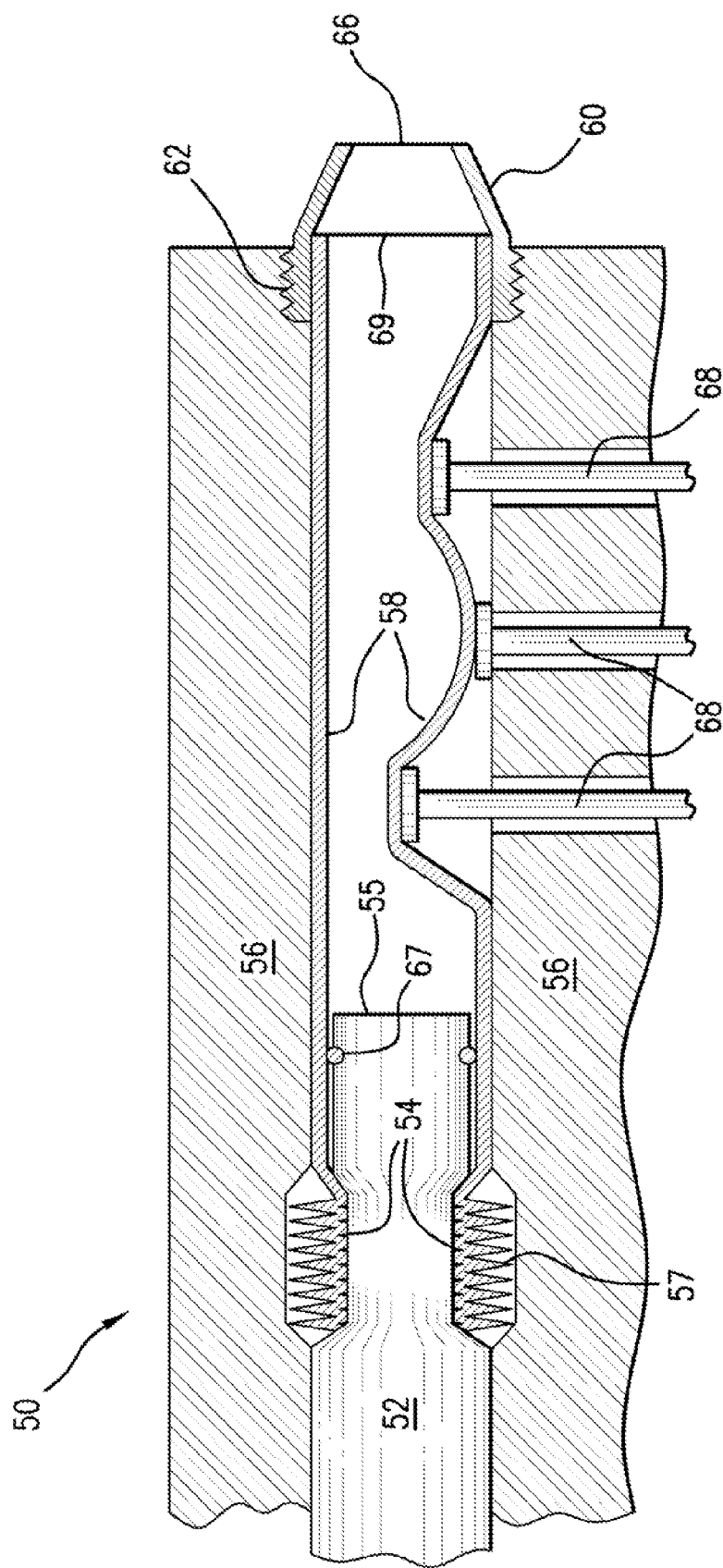
FIG. 4 is a partial, side view, largely cut away and in section, of a dispenser employing a continuous feed, pre-formed reaction tube and a plurality of plunger type mixer elements.
Figure 5:
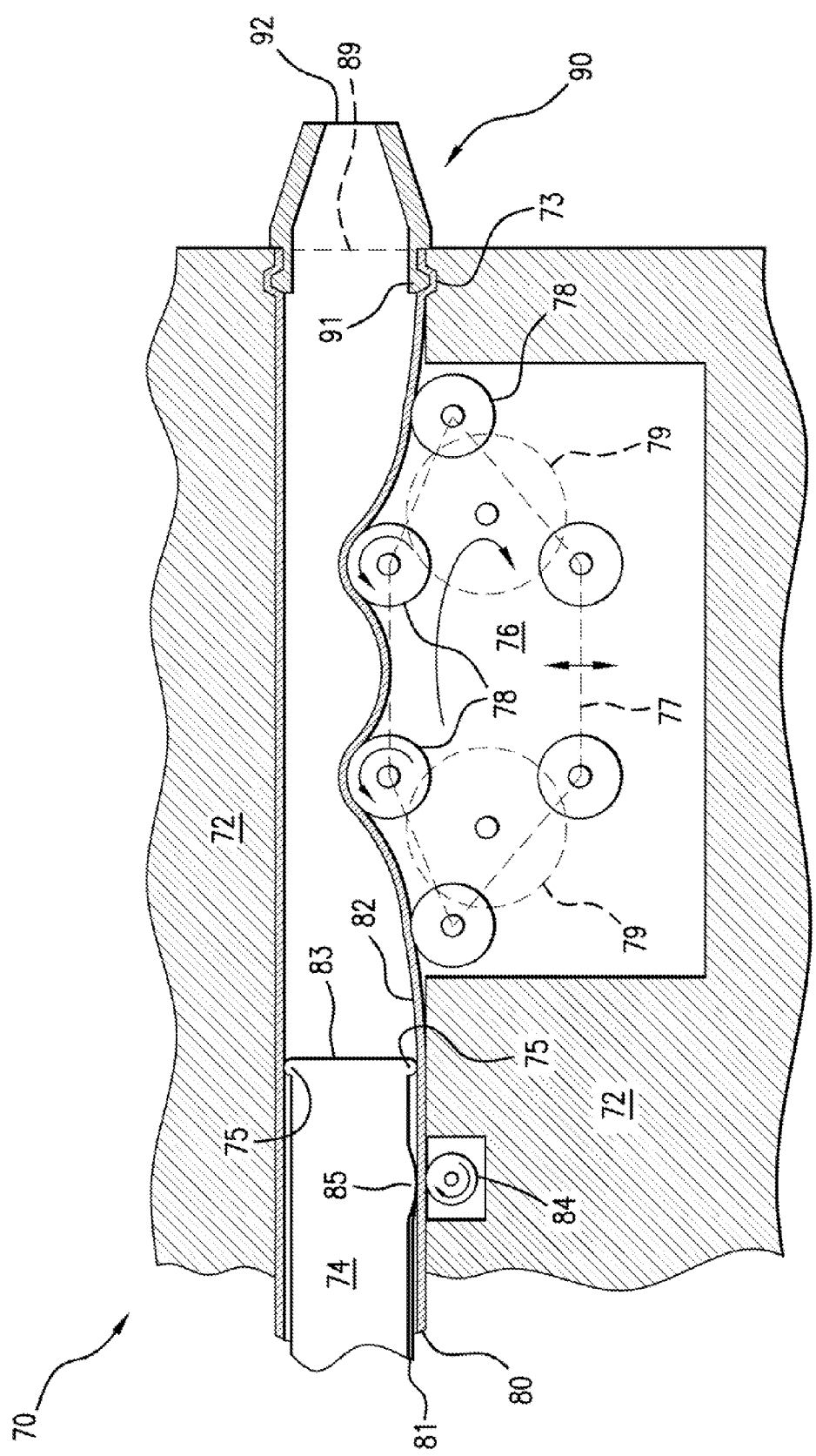
FIG. 5 is a partial, side view, largely cut away and in section, of a dispenser employing a formed-in-place reaction tube together with a peristaltic type mixer means.

The fore region of the manifold body lies within the channel of the reaction tube and has a cross-sectional shape generally corresponding to the desired shape of the reaction tube. Preferably, the fore region of the manifold body is cylindrical with either a round or elliptical cross-section and includes or incorporates means for establishing a leak-tight seal, a manifold seal, between the manifold and the inner wall of the reaction tube as well as outlet means for introducing the curable components into the reaction tube.

Where the reaction tube is a single-use, preformed tube, the fore region of the manifold body will have a reaction tube seat in which the rear or manifold end of the reaction tube is sealingly situated. The seal may result from an interference fit between the end of the reaction tube and the reaction tube seat or it may result from a mechanical compression, with or without a sealant, of the inner wall of the manifold end of the reaction tube against the fore region sidewall of the manifold, which fore region could be a recess or reaction tube seat circumferentially cut into the fore end of the manifold. In this latter configuration, the mechanical compression may arise from the use of a clamp or like means or simply as a result of the assembly of the components of the dispenser device, e.g., a press or compression fit may exist between the manifold body and the dispenser housing or one or more other components of the dispenser. Alternatively, the fore face of the manifold may have a recess integrated or cut therein and corresponding in shape to the manifold end of the reaction tube with a width of the recess being the same as or slightly less than the thickness of the reaction tube wall such that a seal forms when the manifold end of the reaction tube is forced into the recess. Dispensers according to this embodiment of the present invention will typically be of a construction, preferably a modular type construction, which allows for ready access to the fore region of the manifold and, as necessary, the mixer means, for a quick and easy replacement of the single-use tube element.

Where the reaction tube is a continuous pre-formed or formed-in-place reaction tube, the manifold or leak-tight seal arises from an interference fit between a seal means and the inner wall of the reaction tube. The seal means may be integral with the manifold, i.e., formed concurrently with the formation of the manifold, especially in the case of molded manifolds (e.g., a molded in circumferential ridge 75 as seen in FIG. 5), or it may be a distinct element 67, such as an O-ring or like gasket, that fits in a circumferential recess in the sidewall of the manifold body as shown in FIG. 4. Preferably, the gasket or seal is located at a point along the sidewall of the fore region at or near the fore face of the manifold body. This construction minimizes any dead space, hence buildup of curable components, between the sidewall of the fore region, forward of the seal, and the reaction tube inner wall.

Figure 3:
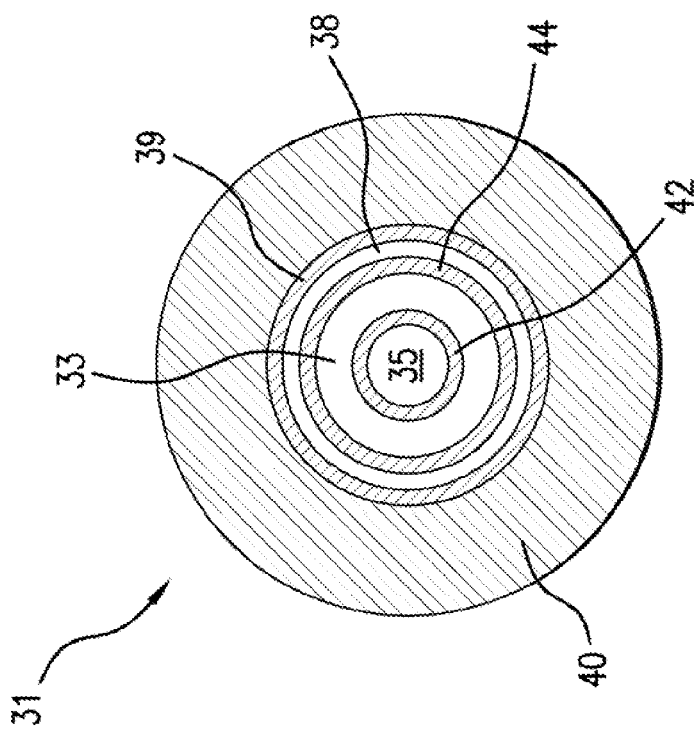
FIG. 3 is a face on view of a second embodiment of the manifold face.
Figure 2:
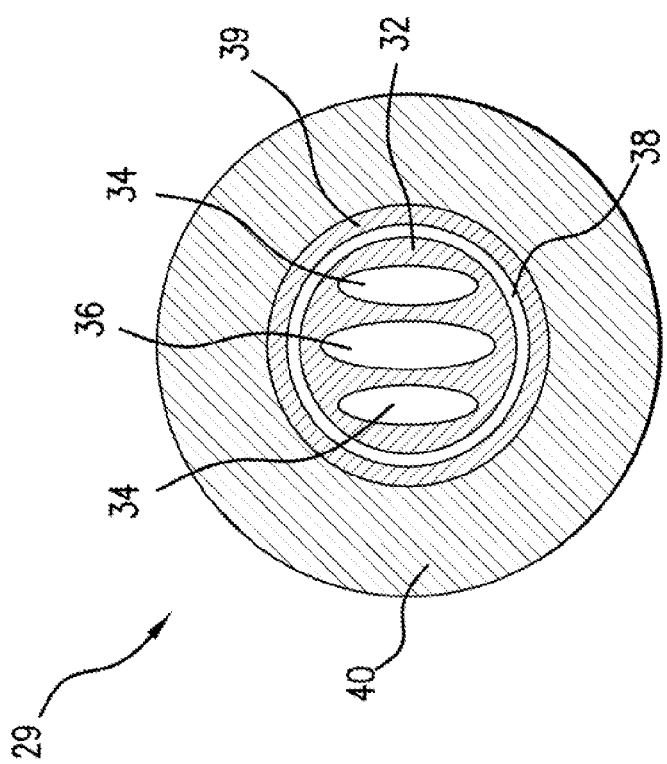
FIG. 2 is a face on view of one embodiment of the manifold face.

As noted, the fore region of the manifold is also characterized by a plurality of outlets on the fore face from which the components of the curable composition are introduced into the reaction tube. The outlets may be arranged in a side-by-side, concentric, alternating pattern or other type arrangement. Although the use of a single outlet for each component will be suitable, it may be preferable to employ a plurality of outlets for at least one of the components. For example, as shown in FIG. 2, the fore end may comprise three concentric outlets with the inner most and the outer most outlets dispensing one component and the intermediate concentric outlet supplying the other component. Alternatively, as shown in FIG. 3, the outlets may be configured to dispense the components in a multi-laminar fashion with repeating layers of one and then the other component. In these situations, there would typically be a single inlet for each component of the curable composition but the pathways within the manifold would be split so as to provide the component to each of the designated outlets.

The outlets, or more specifically the orifices of the outlets, may be coplanar, in which case the fore face of the manifold mimics a die face having a plurality of die openings corresponding to the outlets. Alternatively, the fore face of the manifold may not be planar: rather, it may have a design or configuration whereby the orifice(s) of certain outlets or flow paths extend or are located within the reaction tube at a point downstream from those of others. With this configuration, the curable component of these extended outlets is introduced into the flow of materials already in the reaction tube. Additionally, the width or diameter, i.e., the size or each orifice, of each outlet may be sized according to the desired or needed apportionment of the components so that each component is introduced into the reaction tube in the proper amount, relative to each other, to ensure good cure and performance properties.

Both configurations have their attributes and detriments. For example, in the latter, the second component may be expelled under higher pressure from small orifices into the flow of the first component, whereby the pressure differential causes an expansion of the second component in the first component, pushing the latter away from the orifice of the second component. In the event of a temporary stoppage, any cure or reactivity is removed from the orifice so as not to affect the restart of the dispenser. On the other hand, if the stoppage is sufficiently long so as to allow for any substantial cure in the region between the orifices of the first and second components, the larger surface area contact between the cured material and the sidewalls of the flow paths of the second component, i.e., that whose orifices are further downstream, may decrease the efficiency with which resumption of dispensing will dislodge the cured material. More importantly, if the cure is substantial, the larger surface area contact may affect the ease with which the reaction tube may be advanced, as discussed below, so as to dislodge and enable removal of the cured matter, even in the absence of adhesive bonding. Thus, depending upon the reactivity of the systems involved, it may be beneficial to have all orifices in a substantially co-planar relationship on the fore face of the manifold body. The minimal contact area between the curable composition and the surface of the fore face of the manifold body will allow for a ready release and dislodging of the cured material upon advancement of the reaction tube.

Furthermore, regardless of which configuration is adopted for the outlets, it is preferred that the fore face of the manifold body and, in particular, the orientation and alignment of the outlets themselves, be such as to minimize areas of low flow within the reaction tube at or near the fore face. Such low flow areas provide sites for reactivity, hence undesirable cure, within the reaction chamber. Thus, a preferred fore face will be one where essentially the only surface area of the fore face is that corresponding to the walls of the flow paths from which the components are flowing into the reaction chamber.

The central region of the manifold is typically an elongated region corresponding to the pathway for the curable components from the inlets to the outlets. In the case of the single-use, disposable reaction tube, the central region is essentially the transition zone from the aft region to the fore region. However, if the manifold body is of a configuration that employs or incorporates a plurality of outlets for any one inlet, then the manifold body will have a more defined and complex central region corresponding to that portion thereof where the one stream is divided into two or more streams.

In that embodiment of the dispenser of the present invention where the reaction tube is a long, continuous pre-formed tube, the central region of the manifold may also correspond to or serve as the storage and feed area for the preformed stock tubing. Here the manifold will have a generally circular or elliptical cross-section that tapers or has a circumferential recess rearward of the manifold seal so as to allow for the storage of a substantial length of the preformed tubing. As with the fore region of the manifold, that portion of the manifold body corresponding to the storage area will be within the tubing channel, i.e., the tubing will circumferentially encase this region of the manifold body.

Finally, where the tubing is formed-in-place, the central region of the manifold will correspond to the tube forming area of the dispenser. It may also include the storage for the stock materials for the formed-in-place tubing, though that may also be elsewhere in the dispenser apparatus. Here, as will be discussed in greater detail below, the manifold will have a surface or elements associated therewith that correspond to the needs of the seam forming operation of the tube forming process.

The third and most rearward portion of the manifold is the aft region. This region has integrated therein a plurality of inlets, at least one for each component of the curable composition, for feeding the reactive components to the manifold pathways. Depending upon the overall shape or configuration of the manifold as well as the dispenser as a whole, the inlets may be located on the aft face of the manifold or along the sidewall of the manifold in the aft region. Each inlet is associated with a source or supply of one of the components of the curable composition. Typically, each inlet will be associated, directly or indirectly, with a feed tube connecting the dispenser to a bulk storage or container of each of the components. Alternatively, the dispenser may be a self-sufficient hand-held or portable device, especially one for on-site repair work, wherein the curable components are contained in one or more refillable or disposable supply vessels integrated into or directly attached to the dispenser.

In general, the manifold may be of a unibody construction or it may be an assembly of several elements, all of which are interconnected so as provide or define the appropriate pathways for supplying the reactive components to the orifices of the fore face while concurrently allowing for the advancement or the formation and advancement of the reaction tube. The manifold may be made of any material or materials that is/are non-reactive with the individual components of the curable composition, i.e., will not cause the cure or solidification of either component in the absence of the other. Exemplary materials include metals such as steel, especially stainless steel; aluminum, including anodized aluminum; and plastics, such as polyethylene, polypropylene, nylon, polytetrafluoroethylene. In the case of multi-component manifolds, different materials may be employed for different components. For example, those components that come into contact with either of the curable components or the mixture thereof may be made of a material that is non-reactive with or non-adherent to the curable composition or its components. Alternatively, the contact surfaces of such components may be treated or coated with a material that is non-reactive with and, preferably non-adherent to the curable composition or its components. Such treatments or coatings may be particularly desirable for the fore face of the manifold. Exemplary coatings or treatments include those based on polyethylene, polypropylene, nylon, polytetrafluoroethylene, silicone, or other inert/surface inactive coating materials.

The second, critical element of the dispenser according to the present invention is the reaction tubing. As noted above, the reaction tubing may be a pre-formed tube or a formed-in-place (FIP) tube: the preformed tube may be a defined length, single-use tube or a continuous or substantially continuous, extended use tube. Suitable tubing comprises a thin film, flexible polymer, including elastomeric, material that is non-reactive with the components of the curable composition and, preferably, has good durability, strength and resiliency properties or characteristics so as to enable their use in association with the selected mixing means. Although desirable of all tubing, extended use tubing will preferably be of a material that also has high yield (i.e., will not yield, or the yield will be insubstantial, upon extraction of the tubing from the dispenser or as a result of the action of the mixer means on the tubing). Suitable materials for making the tubing include, but are not limited to, polyethylene, polypropylene, nylon, silicone elastomer, and polytetrafluoroethylene, including homopolymers and copolymers of each, especially high density polyethylene (HDPE) and, for some of the more demanding situations, silicone elastomer. It is also contemplated that other materials may be used to form the tubes including cellulosic materials so long as they do not adversely react with the components of the curable composition and hold up under the conditions experienced in the dispenser. Most preferably, the tubing will be formed of a polymeric or elastomeric material.

The reaction tubing is typically formed by blow molding or extrusion processes and will have a thickness on the order of 1 to 10 mils, preferably 2 to 5 mils. The reaction tubing will preferably be of a circular or elliptical cross-section. The diameter or, in the case of the elliptical tubing, the major axis of the flow path within the tubing will vary depending upon the particular end-use application of the dispenser itself. Those applications requiring a heavy bead of the curable composition may have diameters on the order of an inch or more. On the other hand, for most applications, tubing diameters of from about $1/16^{th}$ inch to $3/4$ inch, preferably from $1/8^{th}$ to $1/2$ inch, will be the norm. Of course large and smaller diameter tubing is also contemplated.

Single-use, preformed tubes are tubes of a defined length, generally corresponding to the desired length of the path of the curable composition from the manifold to the outlet of the dispenser or, if present, to the dispenser nozzle. They are characterized as single-use because the whole length of the reaction tube material is removed and replaced during change-over: change-over typically occurring when the flow of material through the tube is adversely affected by build-up of cured material within the tube or when the dispenser is to be cleaned for storage or shut down for an extended period of time or, if necessary, a change is made in the materials to be dispensed. These single-use tubes are typically cut from the same tube stock materials that comprise the extended use preformed tube or from a tube formed from the formed-in-place stock materials, as described below. Most preferably, the single use tubes will be of a material and have a wall thickness sufficient to render the tube self-standing and somewhat rigid such that the tube may be inserted into the nozzle or dispenser orifice end of the dispenser barrel and pressed into the reaction tube seat rather than having to open the dispenser up to replace it. In this regard, the wall of the reaction tube will be considerably thicker than mentioned above, perhaps on the order of 25 to 50, or even 100 mils or more.

In contrast to the single-use tubes, extended use preformed and formed-in-place tubing are characterized by the presence of a long, continuous length of the pre-formed tubing or the stock materials for the formed-in-place tubing. Of these two, the preformed tubing is preferred and the simplest to deal with, especially where there is concern for spacing and size of the dispenser means. Generally speaking, the extended use preformed tubing will resemble sausage casing that circumferentially encases at least the fore end of the manifold body.

The extended use, preformed tubing stock may be rolled, stacked, folded, pleated, or mounted and inverted about the manifold body. The latter refers to that configuration where a length of the tubing is mounted on a mandrel, preferably a portion of the manifold, and then the direction reversed so that a second layer of the tubing is mounted over the first, the tubing now mounting in an inverted state (i.e., the inner wall is now the outer wall), and direction reversed again and so on. The storage methodology is somewhat dependent upon the resiliency or elasticity of the tubing itself since the more elastic the material the easier it is to roll it or mount and invert it, i.e., the elasticity allows the tubing to stretch and assume a larger diameter to accommodate the rolling or repeated inverting step. In these instances, as the tubing is drawn from the roll or the mounted and inverted state, the elastic properties of its composition allow it to return to its true diameter. As noted, the preformed tubing will circumferentially encase the fore region of the manifold body and, preferably, will be stored in a storage area associated with the manifold. The preferred storage area is associated with the center region of the manifold body and most preferably comprises a recess, notably a circumferential recess, in the manifold body.

The stock material for the formed-in-place (FIP) tubing, on the other hand, is generally in the form of a continuous strip that is capable of forming a leak-tight seam along its edges when the opposing edges of the strip are brought into overlapping contact with one another. Alternatively the strip stock material may be stored in a "C" configuration so that the tube forming means merely requires elements to bring the opposing edges into overlapping contact before forming the seam. Yet another alternative is to employ two strips of stock materials that are mated and sealed in the tube forming means. Here two seal seams, as opposed to one, are formed. The leak-tight seam may be formed by use of a suitable pressure sensitive adhesive carried along one edge of the strip material, by use of in integrated mechanical closure means (e.g., a zipper seal or polymer zipper type mechanism, similar to the seal used on Ziploc® bags.), or by use of fusion bonding. In the latter, heat or an ultrasonic horn, preferably in combination with pressure, is applied to the overlapping edges so as to melt fuse the edges together.

The tube forming means may be integrated into or associated with the manifold and is associated with the center region of the manifold, rearward of the manifold seal so as to ensure a leak-tight tube is formed. Tube forming equipment is well known in the art and generally comprises a plurality of guide means that cause the strip stock material to roll lengthwise, forming the tube around the manifold. As the tube forms, the opposing edges of the strip stock material will overlap, one on top of the other, and be held against one another.

In order to create the leak-tight seal along the seam, the tube forming equipment will also incorporate a seam forming means, the nature or which depends upon the type of seal to be formed. The seal may be an adhesive seal, as with a pressure sensitive adhesive; a mechanical seal, as with the use of a zipper seal type mechanism; or a fused seal wherein the opposing edges are melt fused together. Each requires the incorporation of unique, to the process, means to effectuate the chosen seal and introduces new costs and requirements relative to the stock material.

In the case where two strips of stock material are brought together to form the formed-in-place tubing, the guide means or tube forming means will roll, lengthwise, each strip to bring into mating orientation each set of edges with the edges of the opposing strip. This device will also integrate two sets of seam forming means, one for each seam to be formed. Different devices may be used depending seam to be formed.

For example, the guide and seam forming means may act so that opposing edges of the inner surface of each strip overlap to form the seam. Alternatively, the guide and seam forming means may operate so as to align the inner edge of one strip with the outer edge of the opposing strip so that a true overlapping seam is formed.

As noted above, the seam seal may be formed by a number of different means. Adhesive seals are preferably formed using pressure sensitive adhesives. Pressure sensitive adhesives are desirable because of the immediate or nearly instantaneous bond formation and the ability to select pressure sensitive adhesives having high cohesive and adhesive strengths. In this embodiment, one edge of the strip of tube forming stock material will have a continuous, thin band of a pre-applied pressure sensitive adhesive applied to its surface and covered by an appropriate release strip, e.g., a release film or paper. In the case of formed-in-place tubing comprising two separate strips, one strip of tubing stock may have the adhesive and release strip applied to both edges and none on the other strip of tubing stock or one edge of each strip of tubing stock may have the adhesive and the opposing edge of the other strip of tubing stock to which it is to be bonded is free of the adhesive. Regardless, during formation of the tubing, the release strip is removed from the stock material by a suitable means, thereby exposing the pressure sensitive adhesive, as the stock material is being advanced towards the seam forming means. Here the seam forming means may merely be guide means that mate and apply pressure to the overlapping edges of the stock material; thereby completing the bond formation.

Alternatively, various mechanical closure or seal means may be employed and will typically comprise interlocking, continuous male and female elements, e.g., polymer zippers similar to the "zip-lock" type structures, along opposing edges of the tubing stock. In this instance, the tube forming equipment will incorporate alignment means to align and mate the male and female elements. Mating, which forms the leak-tight seam, may be achieved inherently as a result of a constriction in the advancing path of the tube material. For example, one may design the dispenser so that the gap between the dispenser body and the manifold decrease as the tubing advances along the manifold; thereby squeezing the two elements together. In any event, the manifold seal or gasket will certainly effectuate the closure of such a mechanical seal as the seam passes. Alternatively, a separate mechanism may be added to apply pressure to the mated elements to effectuate the seam. For example, a roller element may compress the mated closure means between it and the sidewall of the manifold.

Finally, in yet another alternative, the leak-tight seam may be formed by melt fusing the opposing edges of the stock material together. In this instance, the tube forming equipment will include a heater element or an ultrasonic horn, preferably in combination with compression means, for effectuating the fusion bond. For example, the tube forming equipment may incorporate a stationary nip wheel or roller in combination with a back-plate, which may be a separate element or a portion of the manifold sidewall. The roller or wheel is tensioned so as to apply a pressure or force against the back-plate and either or both the roller or wheel and the back-plate incorporate or are in a heat transfer relationship with a healing source, whereby the heated element directs sufficient localized heating to the intended site of the seam to establish the fusion bond. The heat source may be, e.g., resistance type heating or induction heating, so long as the temperature is sufficient to establish the bond and, preferably, without creating too much heat as to affect the components of the curable composition or other elements of the dispenser. Alternatively, such elements of the seam forming components may integrate an ultrasonic horn that, in use, causes a fusing of the mated polymer films. In either regard, the preference will be for tube forming stock materials of relatively low Vicat temperatures or melting points. In this respect, actual melting is not needed so long as the polymer materials become sufficiently tacky as to form a sufficiently strong bond upon cooling.

Notwithstanding the foregoing, perhaps the simplest and most convenient form of formed-in-place reaction tube is a pre-formed tube stock having a resealable seam along its length. For example, the preformed tube stock may have a pressure sensitive adhesive seam or a mechanical, interlocking seam, as with the Zip-loc storage bags. In this instance, the stock material is stored in its closed (tube) configuration, typically as a roll of the flattened tube stock. The supply roll may be integrated into the dispenser or ancillary to the dispenser. In either event, tube stock is withdrawn from the supply roll into the aft portion of the dispenser. The tube stock encounters a pin that causes the seam to open to allow entry of the feed tubes for the materials to be mixed and dispensed. Guide means or channels will guide each edge of the seam around opposing sides of the feed tubes and then bring each edge into contact to reform the seam. Preferably, a pinch roller or clamp means is then employed to ensure that the liquid tight seam is reformed along the remaining length of the reaction tube to the dispenser orifice or nozzle.

While single-use tubes and extended use formed-in-place tubing are certainly viable options, it is preferable that the tubing be an extended use, pre-formed tubing or a resealable, formed-in-place tubing. These embodiments provide for long-term use of the dispenser without necessity of shut down and involve the least amount of added expense and complexity. Furthermore, it is to be noted that the use of a preformed tubing also mitigates against concerns as to the integrity of the tubing itself, especially the seam in the case of the formed-in-place reaction tubing.

In the case of the extended use tubing, whether a preformed tubing or formed-in-place tubing, when a change-over is desired or necessary the tubing is merely advanced or pulled through the dispenser assembly until clean tubing appears at the dispenser outlet. The used portion of the tubing is then excised leaving a clean tube in place. For convenience, the tubing may be circumferentially serrated or scored to allow for ready and easy removal from the continuous feed. The circumferential serrations or scores may be evenly spaced along the length of the tubing, perhaps every inch or so, in order to accommodate its use in various dispensers. Here one merely advances the tubing far enough to provide a clean/fresh reaction tube to the dispenser and tears off the soiled or used portion. Alternatively, in order to minimize concern for a potential failure of the tube within the dispenser at the serration or score, especially as the tubing is being advanced or pulled through the dispenser in the mixer means or, more importantly, as a result of the mixer means acting upon the tubing at the point of the serrations or scores, the serrations or scores may be spaced so as to coincide with the operative length of tubing, i.e., that length needed to advance the tube so as to provide a fresh reaction tube for the whole of the curable composition pathway. Generally, and preferably, this length will extend from some point rearward of the manifold seal to the end of or some point past the dispenser outlet, or, if present, to a point within the nozzle or immediately past its outlet orifice. This construction also reduces concern that resistance to the extraction of the tubing from the dispenser, most notably due to cure or partial cure of the materials, will cause a separation of the tubing at the serration or scoring within the dispenser during the extraction process.

As just noted above, change-over of the tubing in the case of the extended use tubing is effectuated by extracting and excising the soiled or contaminated tubing. While this is generally, and preferably, accomplished by manually pulling the tubing through the dispenser, automated means may also be employed. For example, the dispenser apparatus may also have associated therewith or integrated therein a motorized nip roller or like device that advances the tubing. Such a device could be located at the manifold so long as the structural integrity/rigidity of the tubing material allows. Specifically, the tubing must be of such stiffness that it will not buckle as it is being advanced through the dispenser. Alternatively, it may be located at or near the outlet region of the dispenser so that the device pulls, rather than pushes, the tubing through the dispenser body.

The third critical element of the dispenser apparatus is the mixer means. The mixer means may take any number of different forms and configurations so long as it achieves the objective of creating multidirectional flow, and hence mixing, of the components within the reaction tube. The mixer means may be a static mixer or is preferably a dynamic mixer means and acts upon at least a portion of the reaction tube.

In its most simple embodiment, the mixer means may comprise a mixer barrel whose inner surface has a plurality of protruding features, e.g., ribs, waves, screw-like threads, mounds, etc., that impact the flow of the components through the tube. Here, the suppleness of the tube material combined with the multidirectional force of the composition as it enters and fills the tube will cause the tube to compress against and take the shape of the inner wall of the mixer barrel. The projections on the barrel wall thereby extend into the flow pathway and cause a diversion of the flow path, creating the necessary mixing of the components. This device is especially suited for use with curable compositions of low viscosities, preferably those with water-like or otherwise, very fluid viscosity. On the other hand, this device may result in poor or insufficient mixing with higher viscosity materials, especially those of viscosities on the order of 2000 centipoise and higher.

Preferably, the mixer means is a dynamic mixer means, one that comprises a mechanical means that acts upon the reaction tube itself, most preferably a kneading type action, so as to cause a multidirectional flow of the curable components/mixture within the reaction tube concurrent with the general axial flow of the materials towards the outlet. Such dynamic mixers are suited for use with curable compositions of a wide range of viscosities and provide excellent and intimate intermixing of the curable components. Suitable dynamic mixer means generally act by imposing a compression, which may be a complete or partial compression, on at least a portion of the reaction tube. Selection of an appropriate mixer means will depend, in part, upon the viscosity and rheology of the materials to be acted upon.

In perhaps its simplest form, the compression means comprises a chamber through which the reaction tube passes, which chamber has one or more walls or wall sections that moves perpendicular to the reaction tubing to compress the tube with the opposing wall either stationary to serve as a back support or concurrently moving to compress the reaction tube. Alternatively, the mixing means may comprise one or more plunger or piston elements, preferably in a linear, side-by-side relationship, parallel to the flow axis, and a back support on the opposite side of the reaction tube to hold the tube in place while the compression elements are acting or impinging upon the wall of the reaction tube, again in a perpendicular movement to the flow path of the tubing. In order to enhance the mixing effect while concurrently minimizing any detrimental effect on the integrity of the reaction tube walls, it is desirable to employ pistons or plunger type elements that have a broad surface area or pad, integral with or attached to the terminus thereof proximate the reaction tube. Said pads as well as the surface of the back support is preferably comprised of a compressive or resilient material, e.g., an elastomer, so as to better absorb the impact.

Regardless of the type of compressive device chosen, the extent of the stroke or advancement thereof should be sufficient to compress the tube by at least one-fourth, preferably at least one-half, most preferably three-fourths its transaxial dimension. Additionally, if desired, one can configure the operation of the dispenser to allow at least one of the compression elements to fully advance so as to completely collapse the tube, thereby stopping the flow of material. Retracting the compression element will then allow flow to resume. In this embodiment, the use of elastomeric pads and/or elastomeric back support will help ensure a firm contact, so that no leak occurs, while minimizing weakening of the structural integrity of the reaction tube wall.

As mentioned, where a plurality of compression elements is employed, they will typically be aligned in series along the flow axis of the tube. By coordinating or synchronizing their operation, one can controllably alter the impact these elements will have on the general flow of the curable materials through the dispenser and/or the mixing of the curable components within the tube. Specifically one may minimize or maximize the impact on the throughput of the dispenser and/or minimize or maximize the mixing within the tube. For example, in a device having three piston elements, the first being nearest the fore face of the manifold and the third nearest the dispenser outlet, by synchronizing the compression elements to operate in a repeating one, two, three sequence, one will minimize the adverse impact of the compression elements on the flow rate. In those instances where the unimpeded flow rate, i.e., the flow rate dictated by the pressure or forces acting on the curable components to move them into and through the manifold, is slow and the tube has sufficient structural integrity, this sequencing may actually speed up the flow by pushing or forcing the mixture towards the outlet. Conversely, having the elements operate in a three, two, one sequence will impede the flow to the greatest extent and/or create the most amount of backflow, thereby increasing non-axial flow of the curable composition within the tube as well as extending the retention time, thus the mixing time, within the tube.

This construction also allows one to operate the dispenser in a fully on/off mode with a retraction of the curable composition at the dispensing orifice thereby preventing drip or drool. Here, the third compression element, i.e., that nearest the dispensing orifice, is fully depressed. Then at least one of either the first or second compression elements is likewise fully depressed followed by retraction of the third compression element. As the tubing in the area of the third compression element expands, it creates a vacuum within the tubing pulling the curable composition back from the dispensing orifice.

Operation or movement of the compression elements may be achieved by use of a cam (preferably motorized), pneumatic means, or an electronic switch. While each of these will generally result in the advancement and retraction of the compression element, the compression element may also have associated therewith a spring or other bias or tension means whose normal state is associated with the full retraction of the compression element. The frequency of the reciprocation of the compression element(s) will vary depending upon the viscosity and rheology of the materials being acted upon. Generally, it has been found that for most medium viscosity adhesive systems, a 5-60 hertz cyclical compression will suffice to provide good intimate mixing. Obviously, faster or slower cycle speeds may be employed. Simple testing with the curable composition to be dispensed will enable one to choose the optimum cycle rate for the given flow rate and curable composition.

Another type of compression element suitable for use in the practice of the present invention is one that operates by peristaltic means, employing a plurality of rollers that act upon the wall of the reaction tube, affecting the movement of the curable components through the tube while concurrently creating torsional or shear flow within the reaction tube, particularly within the individual tube pockets, i.e., those sections of the tube between successive roller elements of the peristaltic means. Like the compression elements discussed above, the peristaltic mixer means will also have associated therewith a back support for the tube, holding the reaction tube substantially stationary while the pump acts upon it.

The peristaltic mixer means is preferably configured to allow the gap between the roller assembly and the back support to open for ease of insertion and/or advancement of the tubing during tube replacement, e.g., either the roller assembly or the back support may be stationary and the other retractable. During operation, however, the roller assembly and back support are brought into closer proximity with the rollers creating at least a partial, preferably at least about a one-fourth compression of the reaction tube channel, preferably at least about a one-half compression of the reaction tube channel. This configuration allows for a minor amount of backflow under the advancing rollers to enhance mixing: the backflow resulting from the roller advancement itself or pressure within the reaction tube due to a dispenser outlet orifice being smaller than the tube cross-section. Alternatively, the peristaltic mixer means may rotate in the opposite direction to the axial flow of the dispenser; thereby maximizing backflow and mixing. In this configuration, it is preferred that the compression of the reaction tube channel be no more than about one-third so as to allow sufficient materials to continue to flow axially towards the dispenser outlet.

Alternatively, the peristaltic mixer means can be configured so that the rollers completely collapse the reaction tube, thereby providing controlled on-off capability to the dispenser as well: a true peristaltic pump. This configuration also enables one to control the amount and rate at which the mixed curable composition is dispensed. Additionally, so long as the reaction tube is sufficiently stiff or rigid, this configuration allows for the use of the peristaltic pump as a means for drawing the components of the curable composition into the manifold. Preferably, though, the components of the curable composition are provided under pressure to the manifold: the pressure remaining positive even with the peristaltic pump at full speed.

Yet another peristaltic mixer means configuration is one wherein two opposing peristaltic members are present, each operating in the same direction, which may be consistent with the natural flow of the materials along the flow axis or in the opposite direction of the flow axis, or each operating in opposition to the other. In these embodiments, the peristaltic rollers will only partially collapse the reaction tube, each being spaced from the other to ensure flow of the mixed composition along the axial flow path. Preferably, neither peristaltic means will compress the reaction tube channel by more than one-third, preferably not more than one-fourth. The dual operating peristaltic means, particularly with one or both operating in the opposite direction to the natural flow of the curable composition along the flow axis, create intense and significant flow of the materials, thereby providing intimate mixing, even with curable compositions of moderate to high viscosities.

The roller assembly of the peristaltic mixer means may be a rotor type assembly having a plurality of roller elements along its circumference and being driven by a motorized, rotating shaft (like a traditional peristaltic pump) or it may comprise an oval or race-track type configuration of a plurality of rollers integrated into a loop chain or linked structure that is circulated on a plurality of hubs, at least one of which is the drive hub that has associated therewith a motor means. With the rotor assembly, the back support against which the rollers are biased will have an arch configuration similar to the curvature of the rotor. The oval or race-track type peristaltic member will have a flat back support against which it is biased. Peristaltic pumps and their components are widely available.

To provide additional shear within the tubing, it is also contemplated that the rollers of the peristaltic mixer means may be contoured or patterned. For example, the rollers may have one or more spiral, screw-like threads protruding from the surface thereof or corresponding recesses cut into the surface of the rollers. Alternatively, the rollers may have a plurality of bumps, wedge-like or V-shaped protrusions, etc. on the surface thereof so that as the tubing passes the rollers these protrusions create additional shear and alter the flow direction within the curable compositions within the tubing.

Another mixer means that acts similar to the peristaltic pump, but is much simpler in construction, is an impeller wheel whose paddles or blades run at an angle, preferably from 45° to 90°, to the axis of the reaction tube and the materials flow within the tube. Like the peristaltic pump, the impeller wheel may rotate counterclockwise to the materials flow so as to mix the materials within the reaction tube as well as expedite their flow there through and/or increase the material pressure within the reaction tube forward of the mixer means. With a counterclockwise rotation, when the paddles of the impeller are at least as wide as the reaction tube in its flattened state and the impeller wheel is in its fully advanced position such that at least one impeller paddle compresses the reaction tube against dispenser barrel wall or the back support wall of the dispenser opposite the impeller wheel so as to stop the flow of materials through the reaction tube, even in light of the pressure of the materials in the reaction tube aft of the impeller wheel, the impeller wheel also serves as a regulator for controlling the dispensing and amount of material being dispensed from the dispenser. Preferably, in this embodiment, it is important that the paddles, including that portion extending form the hub of the impeller wheel, are made of a flexible or elastomeric material so that the paddles of the impeller wheel flex when compressing the reaction tube against the dispenser barrel or back support wall. Where dispensing is to be fully controlled by the impeller wheel, the diameter of the impeller wheel and the spacing between the paddles is such one impeller paddle fully compresses the reaction tube at all times. In this respect, the spacing between adjacent impeller paddles is such that as the impeller wheel rotates, one paddle will begin to release the compression of the reaction tube against the dispenser barrel or back support wall as the following paddle begins the full compression of the reaction tube. Because of the flexibility of the tube and the pressure of the materials in the tube a defined quantity of the materials in the tube will be momentarily isolated in the tube length between the adjacent paddles. Thus, as noted above, not only does this orientation allow for on-off control but also greater control on the amount of material being dispensed at any time.

Of course, it is not necessary that the impeller wheel be fully advanced against so as to cause the full compression of the reaction tube, as described above. Instead, the impeller wheel may be advanced so as to cause only a partial compression of the reaction tube, as discussed above with the other mixer means, so as to increase shear and mixing within the reaction tube. In this embodiment, rotation of the impeller wheel may be either counterclockwise, i.e., with the flow, or clockwise depending upon the desired degree of mixing and the viscosity of the materials to be mixed. With a counterclockwise rotation, as noted previously, flow through the reaction tube is only modestly impacted: faster or slower depending upon the flow rate of the materials into the reaction tube and the relative rate of rotation of the impeller wheel. With a clockwise rotation, a modest backpressure and flow is created in the reaction tube in the region immediately forward of the advancing face of the impeller paddle. This latter configuration creates the most shear and torsional flow within the reaction tube and is especially desirable for difficult to mix and high viscosity components.

Operation and rotation of the impeller wheel may be controlled manually or, preferably, by use of a motor. Generally, an axel will be attached to or comprise the hub of the impeller wheel, which axel is connected to a manually operated crank or to a motor means. Obviously, for high speed, industrial use, a motorized impeller wheel is necessary.

Finally, yet another mixer means employs one or more rollers that are attached to a reciprocating means so that the roller moves back and forth along and/or across a given length of the reaction tube. In this configuration, rather than have the rollers on a circular hub or as part of a linked loop, the roller moves parallel to and/or at an angle to the reaction tube in a reciprocating motion. In one embodiment, the roller means may be attached to a motorized arm that swings the roller across the reaction tube in a reciprocating action, similar to the operation of the windshield wipers of ones automobile. Although such means may be fully advanced to fully compress the tubing, with this type of mixer means, it is preferable that the reaction tube be only partially compressed: the extent of compression being sufficient to create the necessary shear and torsional flow within the reaction tube to provide sufficient mixing without stopping flow altogether. Alternatively, full compression could be accommodated here so long as the rollers are of such size and orientation as not to completely stop flow through the reaction tube. Although it is possible to enable complete flow stoppage, it is less desirable since this configuration, in a continuous dispensing mode, would have the greatest impact on flow through the dispenser, creating a more inconsistent or reciprocating flow rate. The partial collapse of the reaction tube allows for a more consistent flow rate and dispensing of materials.

The roller elements themselves may be smooth surfaced or may have a contoured or shaped surface as discussed above with respect to the peristaltic rollers. Further, as also noted above, the roller means is preferably operated by a motor means that controls the degree and rate of reciprocation of the roller means along and/or across the reaction tube wall.

Clearly, many different types and configurations of mixer means may be employed in the dispensers of the present invention. The specific selection depends, in part, on the type of curable composition involved and the desired operational control to be associated with the dispenser device.

The aforementioned elements of the novel dispenser of the present invention are integrated into and supported by a dispenser body, which may or may not be enclosed within a dispenser housing or which may also comprise the dispenser housing. As is typical of most any dispenser device, the dispenser body is comprised of many interconnected elements that comprise and/or orient and position the operating elements of the dispenser as well as define the flow path of the materials within and through the dispenser. However, the dispensers according to the present invention are preferably constructed so as to allow quick and ready access to the manifold and, if present, the preformed tube stock supply or the stock supply and/or tube forming means of the formed-in-place tubing so as to allow for cleaning of the manifold and prompt replenishment of the stock materials, as appropriate. Those skilled in the art, having the benefit of the present disclosure, will readily appreciate the various designs and configurations that may be produced, as well as the method of their production, in order to accommodate and incorporate the critical elements of the novel dispenser means as discussed above.

In accordance with the preferred embodiment of the present invention, the dispenser body also comprises one or more elements that define or create a dispenser channel through which the reaction tube traverses, providing support to prevent expansion or kinking of the reaction tube as well as maintaining the reaction tube in a given orientation. The defined dispenser channel may be on both sides of the mixer means or the mixer means may be incorporated into and form a part of the dispenser channel and, in any event, extends from the mixer means to the dispenser outlet.

The geometry and dimensions of the dispenser channel may be consistent along its path or it may transition one or more times, depending upon the basic construction and configuration of the dispenser, especially the mixer means and/or the dispenser outlet, and its use. For example, if the reaction tube is of an elliptical cross-section, the dispenser channel will help the reaction tube maintain that cross-section even with the pressure of the material within the reaction tube. If the reaction tube coming from the manifold is circular in cross-section then the dispenser channel may transition that shape to a more elliptical shape before it enters the mixer means. As mentioned above, reaction tubes of an elliptical cross-section, whether by construction of the tubing itself or as a result of the impact of the dispenser channel, is especially desirable, particularly in that length corresponding to the mixing chamber, since it provides a good, somewhat flat or flatter surface area for the mixer means to act upon the reaction tube. On the other hand, if the reaction tube is of an elliptical cross-section as it leaves the manifold, e.g., one that accommodates a multi-laminar type die face, the apparatus is preferably configured so that the flatter surface of the elliptical tubing is presented to the mixer elements of the mixer means. Similarly, if the reaction tubing is too elliptical, i.e., the minor axis is very small relative to the major axis, it may be desirable for the dispenser channel to transition the reaction tube to a more circular or broader elliptical cross-section so as to allow for sufficient compression of the tubing concomitant with continued flow, as appropriate.

It may also be desirable to alter the cross-section of the reaction tube orifice so as to alter the shape and/or dimensions of the bead or deposit of the curable composition arising from the dispenser. Because the reaction tube extends beyond the orifice of the dispenser outlet, the shape and dimensions of the dispenser outlet, most notably the dispenser outlet orifice, directly affects the shape of the reaction tube orifice. Thus, by controlling the latter, one also controls, at least to some extent, the former. For example, if it is desired to leave or dispense a broad, thin band of the curable composition, the channel may transition from a circular or slight to moderate elliptical cross-section to an extreme elliptical cross-section having a high aspect ratio of its major axis to its minor axis. Similarly, beads of semi-circular, pyramidal, or trapezoidal, etc. cross-section may be deposited by making the appropriate transitions within the dispenser channel leading up to the dispenser outlet.

Alternatively, or in addition to the aforementioned shape transition, the dispenser channel may taper as it approaches the dispenser outlet, regardless of its cross-section. Such tapering will increase the pressure within the dispenser, again, enabling more control over the dispensing of the curable composition, especially the bead of curable materials being deposited, if desired. However, taper and/or an irregular shaped orifice may lead to longitudinal crimping of the reaction tube as well as a constriction in the flow of the curable compositions through the dispenser outlet as well as create back pressure within the reaction tubing. Although tolerated, the degree of taper and/or the constriction or shape of the orifice must not be so large as to adversely affect the flow or dispensing of the curable composition; otherwise, there is the risk of premature or excess cure in the tube. Similarly, crimping should be minimized since the crimped regions also provide areas of low flow and, consequently, high risk of set-up or cure. Furthermore, crimping may cause a distortion or misalignment of the deposited bead. Thus, dispensers wherein the dispenser channel leading to the dispenser outlet or the dispenser outlet themselves have tapered and/or constricted or irregular shaped orifices are not recommended for applications requiring precision in bead structure/dimensions and/or placement.

Alternatively, such crimping is tolerated so long as the dispenser barrel includes guide means that control the manner in which the crimping occurs. Specifically, the inner walls of the dispenser barrel may have contoured ridges that help the reaction tube wall collapse and fold over on itself in a single location so as to present a substantially smooth inner surface.

Where true precision in dispensing is desired or needed, it is especially desirable to employ a nozzle element that is associated with or attached to the dispenser outlet and is readily and easily removed therefrom. Suitable dispenser nozzles will have a tapered barrel ending in a defined orifice: the nozzle orifice taking any number of shapes and dimensions depending upon the application and the desired bead or deposit of the curable composition. As noted above with respect to the dispenser outlet, the orifice of the nozzle may be designed to provide for a thin or thick, wide or narrow band of a semi-circular, pyramidal, trapezoidal, etc. cross-section. Preferably, the nozzle element will be disposable, preferably a molded piece made from the same or a different plastic as is used to make the reaction tube. Alternatively, the nozzle may be cleanable and reusable.

Several options exist for the orientation of the nozzle and the reaction tube. In one, the reaction tube extends into the channel of the nozzle and ends at a point at or near the transition point where the inner barrel of the nozzle tapers. Here, the pressure of the curable composition on the inner wall of the reaction tube creates a seal between the outer wall of the reaction tube and the inner wall of the channel through the nozzle so as to prevent any egress of the curable composition back towards the mixer means along the outside of the reaction tube.

Figure 13:
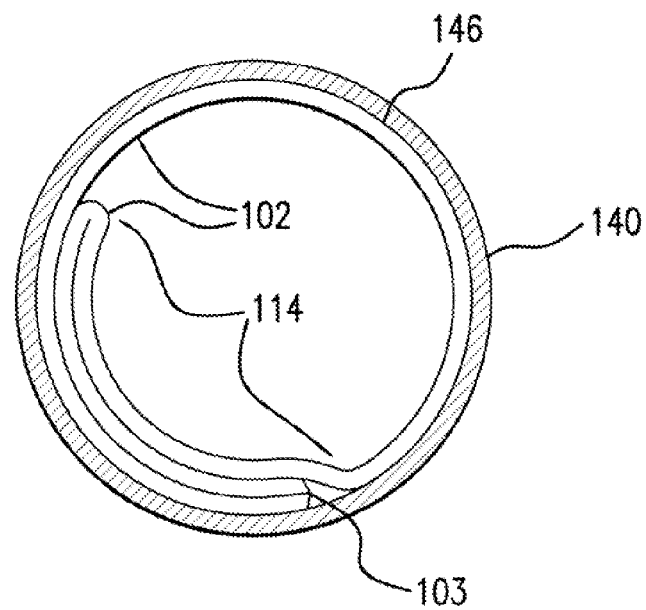
FIG. 13 is a cross-sectional view of the nozzle element of the dispenser of FIG. 6 taken along line 13-13.
Figure 14:
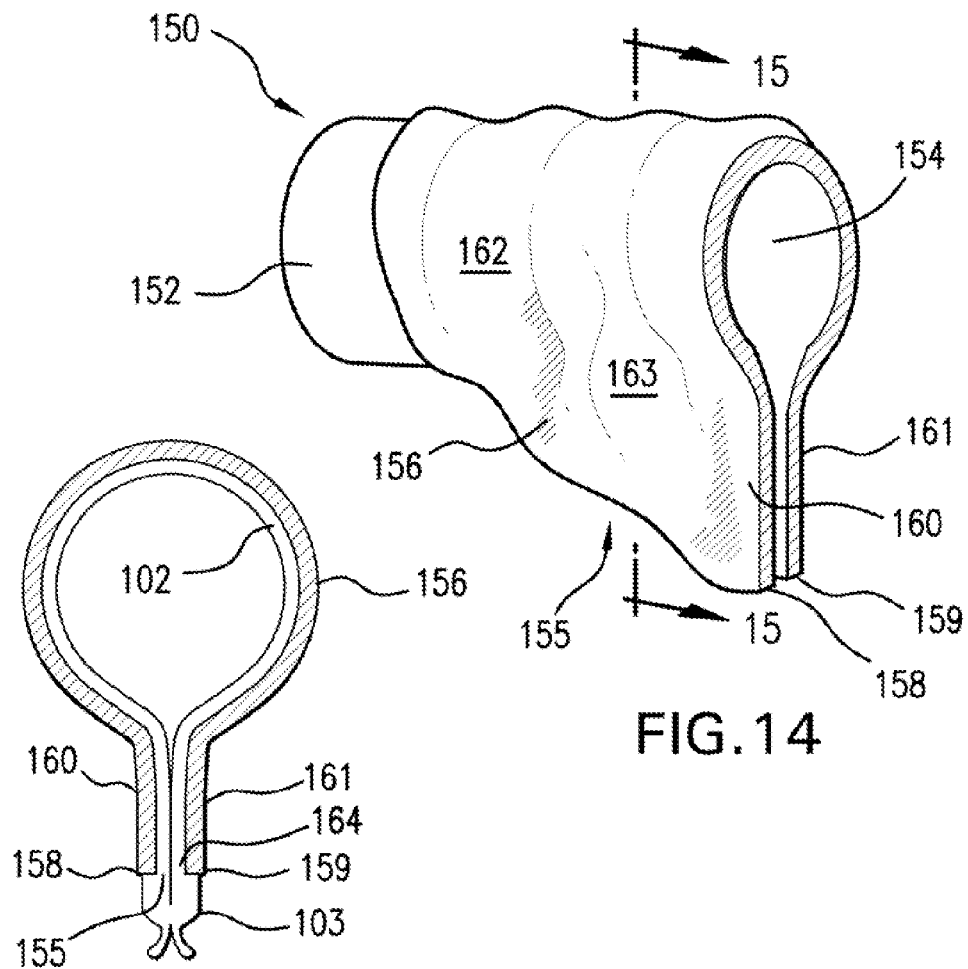
FIG. 14 is a slightly elevated, front side view of an alternate embodiment of a nozzle element for the dispenser of FIG. 6.
Figure 15:
FIG. 15 is a cross-sectional view of the nozzle element of FIG. 14 taken along line 15-15.

In a second embodiment, the reaction tube may extend into the taper end of the nozzle ending at or near the nozzle orifice or immediately outside of the nozzle orifice. In order to accommodate the constriction of the reaction tube diameter, the nozzle will either have guide means that enable the reaction tube wall to roll or fold over on itself (as seen in FIG. 13, to be discussed in greater detail below) or have a configuration that compresses the reaction tube wall so that the passageway becomes progressively narrower and narrower or smaller and smaller as one approaches the nozzle orifice while concurrently accommodating the compressed wall section, e.g., a slot running the length of the nozzle (as seen in FIGS. 14 and 15, to be discussed in greater detail below). Whichever embodiment is selected, it is best to avoid uncontrolled crimping of the reaction tube in the nozzle as such crimping will affect the flow path in the reaction tube leading to areas of low flow and, hence, quick buildup of cured or partially cured materials. Additionally, when the reaction tube ends in the nozzle itself, such uncontrolled crimping may provide a flow path around the end of the reaction tube thereby enabling the curable materials to flow back into dispenser barrel itself, outside of the reaction tube.

Alternatively, the nozzle element may be configured with a circumferential or annular flange extending from the rear portion of the nozzle that fits into the end of the reaction tube, preferably in a snug fit and, most preferably forms a compression seal between the nozzle element and the dispenser outlet or body, when properly positioned. The construction and design of these elements will be such that there will be little if any change in the diameter of the curable composition flow path as it transitions from the reaction tube to the nozzle so as to avoid the creation of areas of low flow.

As mentioned above, the dispenser apparatus of the present invention may also have integrated therein or associated therewith means for advancing the reaction tube within the dispenser channel. If present, such means may be located at or near the manifold seal where it helps pull the new material from the stock supply and/or, in the case of the formed-in-place reaction tube, through the tube forming means. Additionally, or alternatively, such means may be located at or at a point past the dispenser outlet where it pulls the reaction tube through the dispenser channel. Typically, such a means will comprise a nip-roller type assembly.

The dispenser may also have associated therewith a pressure sensor means that is capable of detecting changes in the flow rate through the reaction tube. Such sensor means may be integrated into the manifold fore face where it responds to direct fluid pressure or it may be integrated into the wall of the dispenser channel where it detects changes in the pressure of the fluid within reaction tube against the wall of the reaction tube. Such sensor mean may be associated with an alarm, light or other alert means so as to notify the dispenser operator, or the plant/line operator in the case of industrial applications, of changes in flow the flow rate, as reflected by the pressure change, and, in following, the need for a changeover in the reaction tube. The operator can then begin the sequence to remove the spent tubing manually or by automated means. In the latter case, the sensor means may also be associated with the aforementioned advancer means to automatically advance the reaction tube within the dispenser channel to expel the spent tubing. The spent tubing may then be cut and removed manually or the advancing means may also have associated therewith or be in operative communication with a cutting means which cuts and removes the spent tubing from the new or clean tubing as it exits the dispenser outlet.

Additionally, the dispensers according to the present invention may also contain any number of other elements commonly associated with dispensers of fluids, especially adhesive and sealant type compositions. For example, the dispensers may integrate a plurality of valve means for controlling the flow of the components of the curable composition into the manifold. Suitable valve means include traditional seat-valve means wherein the valve moves away from the seat to allow flow though the seat and advances to form a seal with the seat when flow is to be stopped. This is especially desirable with high volume applications in which the curable components are fed to the dispenser under pressure from a large storage vessel since this allows one to keep the components under pressure while the reaction tube is being changed out or other maintenance work is being performed on the dispenser, including the complete change out thereof. This is especially important in those devices that employ a single-use reaction tube and is desirable, to avoid somewhat messy circumstances, when completing the change out of the extended use preformed or formed-in-place reaction tube, particularly if a nozzle element is also present.

Nevertheless, it is to be understood that such valve means are not needed in the case of the extended use preformed and formed-in-place reaction tubing since, as noted above, one can achieve the same result, namely the operation and regulation of the dispenser by the proper selection and/or orientation of the mixer means. Here, the reaction tubing would be advanced as the flow of curable compositions continues. Once the length of tubing is advanced sufficiently to ensure that the "old" tubing is fully expelled from the dispenser channel, the mixer means may be deployed to stop the flow of materials for sufficient period of time to excise the old tubing and, if appropriate, remove and replace the nozzle element. While excising of the old tubing may be done without stopping the flow of material, especially where no nozzle element is employed, such is not desirable due to the creation of messy circumstances and the potential for contamination of the dispenser and other work surfaces with the curable composition as well as exposure to and contact with the operator. Even though it may not be absolutely necessary, some alternate control means is preferred, especially for effecting the change out of the spend or soiled reaction tubing when the mixer means must generally be withdrawn from the advanced position where they are acting upon the reaction tubing, e.g., where there is considerable solids formed in the reaction tube that cannot pass the mixer means without their retraction or withdrawal.

Alternative valve means that may be integrated into the dispenser means of the present invention are those known as positive displacement valves which meter and, essentially inject, a predetermined amount of each component into the manifold. The use of positive displacement valves is especially desirable where the two components of the curable composition have significant differences in viscosity. The on-off characteristic inherent to these valves allows one to suspend operation and make the change-over for a new reaction tube in the case of the single use tube or, in the case of extended use tubing, for advancing clean tubing into the dispenser channel or for restocking the supply of preformed tubing or form-in-place tubing stock.

All of the elements or components of the dispensers according to the present invention are known and, in most instances, commercially available or are readily attainable by modification of such known or commercial elements: such modifications being well within the skill of one of ordinary skill in the art having the benefit of the disclosure of this application. However, the combination of these elements for a dispenser and the specific combination and their orientation and purpose are not known and represent a significant advance in the art of dispensing multi-part curable compositions.

Having described the invention in general terms, attention is now directed to FIGS. 1 through 15 depicting various configurations and embodiments of the inventive aspects of the dispensers of the present invention.

FIG. 1 depicts a partial, substantially cross-sectional view of a dispenser 1 according to the present invention wherein the reaction tube is a preformed, disposable, "single use" reaction tube 7. The dispenser manifold 6, as shown by the partial cutaway view, has a plurality of passageways 13 and 11 for reactive components A and B, respectively. The reactive components are supplied to the manifold from sources within or outside of the dispenser through inlets that are on the side or rear face of the manifold, not shown. The manifold ends in a manifold fare face 15 having outlets 10 and 12. The fore end of the manifold also has a manifold seat 14 comprising an annular recess for receiving the butt end 30 of the reaction tube 7. Preferably, the annular recess provides an interference fit with the reaction tube so as to form a good seal between the manifold and the reaction tube wall 8. The manifold 6 and the reaction tube 7 are contained within a dispenser body 4 having a dispenser outlet 24 from which the other end of the reaction tube 7 extends, thereby defining the dispenser orifice 9.

According to the embodiment shown in FIG. 1, this dispenser has a single compressor type mixer means 16 integrated into one side of the dispenser body 4. This mixer means comprises a large pad 18 and an integrated "T" end 23 extending through a section of the dispenser body and a spring 20 and ending at a rotating cam shaft 21. The cam shaft is rotated by a motor, not shown. As the cam rotates, the extension on the cam shaft 25 acts upon the "T" end 23 causing the compressor pad 18 to advance, compressing the reaction tube wall 8. As the cam rotates further, the spring 20 causes the compressor pad 18 to retract, allowing the reaction tube wall to return to its original shape. The action of the compressor pad 18 on the reaction tube wall 8 causes a mixing of the reactive components A and B within the reaction tube 7.

As the mixture advances in the reaction tube, it is expelled through the reaction tube orifice 9. The reaction tube preferably extends beyond the dispenser outlet 24 to ensure that none of the reactive materials contaminate the dispenser assembly.

FIGS. 2 and 3 show, in cross-section, two embodiments of the myriad of alternate configurations suitable for the fore end of the manifold 15. Both dispenser cross-sections 29 and 31, in FIGS. 2 and 3, respectively, depict the fore end of the manifold of FIG. 1 taken along the line 2-2. FIG. 2 shows that configuration wherein the manifold face expels the two reactive components in a laminar relationship with the component expelled through outlet 36 being sandwiched between a second component as the latter is expelled from outlets 34. FIG. 3 shows the embodiment where the two components are expelled in a concentric configuration with the component being expelled from outlet 35 being encased within the component being expelled from concentric outlet 33: in essence a core/sheath type arrangement. The flow paths through the manifold are defined by one or more walls 42 that serve to isolate the two flow paths.

FIGS. 2 and 3 also show cross-sectional views of the reaction tube seat on the manifold. Specifically, as seen, the end of the reaction tube wall 38 is sealingly engaged in the annular recess defined by the main body of the manifold 32 in FIG. 2 and 44 in FIG. 3 and the outer ring of the annular recess 39. The manifold and reaction tube elements are held in respective orientation by dispenser body elements 40.

Of course, as discussed above, further alternative configurations are possible, both with respect to the manifold face and the configuration, orientation and numbers of outlets or orifices as well as with respect to the means by which the seal is formed between the end of the reaction tube and the fore end of the manifold. For example, the manifold fore face may have just two outlets, one for each of the two components. Similarly, the manifold fore face may have an order or random orientation of a plurality of outlets for each component which inherently introduces the components into the reaction tube in a partially mixed state. With respect to the reaction tube seat, it is also contemplated that the reaction tube seat may merely be a concentric indentation at the fore end of the manifold, i.e., as depicted but without the outer ring of the annular recess 39. Here the butt end of the reaction tube fits over the fore end of the manifold and the dispense body is designed to compress the tube wall against the manifold upon assembly of the dispenser body about the manifold.

FIG. 4 presents yet another embodiment, a preferred embodiment, wherein the dispenser assembly 50 employs a continuous preformed reaction tube 58 in combination with a plurality of plunger type mixer means 68. Unlike the embodiment in FIG. 1 wherein a defined length of reaction tube is inserted until a change over is needed (at which point it is removed and replaced), this embodiment employs a reservoir or supply of stock preformed reaction tube 57. Here, the stock or supply or reaction tube 57 is stored in a circumferential recess 54 about the manifold body 52. An O ring 67 set in a circumferential recess in the fore end of the manifold body 52 establishes an interference fit seal with the inner wall of the reaction tube 58 so that material expelled from the fore face 55 of the manifold 52 does not back up into the body of the dispenser or into the stored reaction tubing.

The dispenser FIG. 4 also shows an alternate embodiment for the mixer means. Here the mixer means comprises a plurality of plunger elements 68. These plunger elements operate upon the wall of the reaction tube 58, compressing the tube and thereby mixing the contents thereof. As shown, and as discussed more fully above, the individual plunger elements 68 operate at different times so as to increase disruption and change of flow of the materials within the reaction tube. Movement of the plunger elements may be controlled by mechanical, pneumatic, or electronic control means, not shown. Furthermore, though not shown in this particular embodiment, the plunger elements may also have associated therewith springs, as shown in FIG. 1, for biasing the plunger elements to the fully retracted position in the event that the control means fail.

The dispenser shown in FIG. 4 also employs a removable nozzle element 60 that is attached to the dispenser body 56 by screw threads 62. The reaction tube end 69 lies within the nozzle element 60, preferably at or near the conical section thereof or just inside the conical section, so that the pressure of the materials within the reaction tube maintains a seal between the reaction tube end wall and the inner surface of the nozzle element to prevent materials from backing into the dispenser body. The nozzle element ends in a nozzle orifice 66 from which the materials within the reaction tube are ultimately dispensed.

FIG. 5 depicts yet another alternative dispenser 70 wherein a continuous formed-in-place reaction tube 82 is employed together with a peristaltic pump type mixer means 76. The formed-in-place reaction tube 82 is formed from a stock supply of reaction tube stock, not shown, and guide elements, not shown, that wrap the reaction tube stock feed around the manifold 74. Suitable tube stock includes those films having interlocking components along each continuous (lengthwise) edge of the film that, when mated form a liquid tight seam, e.g., tube stock forming materials employed in making re-sealable storage bags such as those sold under the Ziploc brand. Alternatively, the tube stock may comprise a continuous length of a polymer film having a heat sensitive and/or pressure sensitive adhesive along at least one of the two continuous edges such that when the two edges are brought into contact with each other and heat and/or pressure applied, a liquid tight seam is formed. Finally, in yet another embodiment, the tube-forming film stock may merely be a polymer film that is readily capable of being fused together.

As shown in FIG. 5, opposing edges 80 and 81 of the reaction tube stock are brought into a mating or overlapping position along the manifold body 74 at a point at or prior to a reaction tube sealing means. The reaction tube sealing means comprises a nub 85 on the manifold body 74 and a press roller 84 integrated into the dispenser body or housing. Where the reaction tube forming stock material employs a heat activated adhesive, the press roller will preferably integrate or be in a heat transfer relationship with a heat source so as to activate the adhesive at the seam. Where the reaction tube forming film is capable of fusion bonding, the nub or the press roller may comprise an ultrasonic horn that causes the opposing edges of the polymer film to melt fuse together. The press roller is retractable, as shown by the arrow, so as to allow the initial feed of the tube stock past the manifold and through the dispenser body.

In operation, the opposing edges of the reaction tube stock are compressed between the press roller 84 and the nub 85 to cause the two to mate or bond, depending upon the specific closure mechanism of the stock material. The formed-in-place reaction tube 82 extends over a seal ring 75 integrated into and circumferentially extending from the manifold body 74 and into a chamber defined by the dispenser body 72. The seal ring 75 serves the same purpose as the O ring in FIG. 4, isolating the interior of the dispenser body from the liquid components within the reaction tube. As with the dispenser of FIG. 1, the components to be mixed and dispensed are expelled from the fore face 83 of the manifold into the reaction tube 82.

The dispenser mechanism of FIG. 5 employs a peristaltic type mixer means 76. Various types of peristaltic means are known and may be employed. For example, FIG. 5 depicts an ovoid peristaltic means with few roller elements 78; however, a similar device could be employed with more roller elements or a circular peristaltic means could be employed. The latter would require an opposing curvature in the wall of the dispenser body 72 opposite the peristaltic means. The peristaltic means is on a retractable mechanism, shown by the arrow, so that the roller elements may be fully retracted to allow for feeding and/or changing of the reaction tube as well as a purging of the tube.

The peristaltic means in FIG. 5 has two rotating hub elements 79, and a link loop 77 to which a plurality of roller elements 78 are connected. One of the hub elements 79 is attached to a motor (not shown) for advancing the link loop 77 so that it rotates the loop link about the two hubs in the direction of the loop arrow. As known to those skilled in the art, the hubs engage link elements or other like elements of the link loop thereby advancing the integrated roller elements 78 as well. The roller elements 78 rotate in the opposite direction to the rotation of the link loop as they pass over and advance along the reaction tube wall 82. That portion of the dispenser body 72 opposite the peristaltic means serves as a support to allow the latter to compress and act upon the reaction tube. As discussed above, the peristaltic rollers may partially or fully compress the reaction tube. In the latter circumstance, the peristaltic means also operates as a true peristaltic pump regulating the flow of materials through the dispenser. Alternatively, mixing may be increased by reversing the peristaltic means rotation; however, here the reaction tube compression should be no more than 50%. This creates additional torsional or shear flow within the reaction tube enhancing the intimate mixing of the components.

The dispenser 70 of FIG. 5 also shows another nozzle arrangement. Here the nozzle element 90 has a circumferential or annular tab or flange section 91 that fits inside the reaction tube end 89 and forms a snap fit with a recess 73 in the end section of the dispenser body 72. This snap-fit mechanism secures the end of the reaction tube between the nozzle tab section and the dispenser body, thereby securing the nozzle to the dispenser body while concurrently forming a seal so that the component mixture within the reaction tube is directed into the nozzle element and dispensed through the nozzle orifice 92.

During operation of the dispensers of FIGS. 4 and 5, when the flow of the materials through the reaction tube is restricted due to cured materials and/or it is desired to change the materials being dispensed, the nozzle element is removed and the operator then pulls the reaction tube out of the dispenser body until the spent portion is fully removed. The spent tube is then excised from the new fresh tubing and the nozzle cleaned and replaced or a new nozzle element attached. The dispenser is then ready to resume operation.

Figure 8:
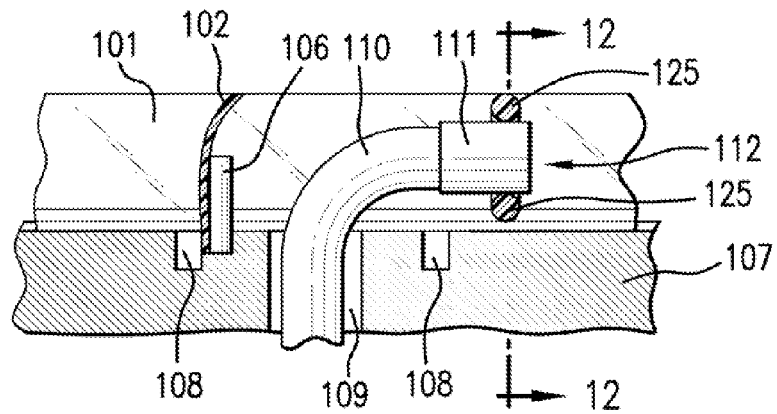
FIG. 8 is a side view, largely cut away, of that portion of the dispenser of FIG. 6 where the feed tube enters and the manifold resides in the reaction tube.
Figure 9:
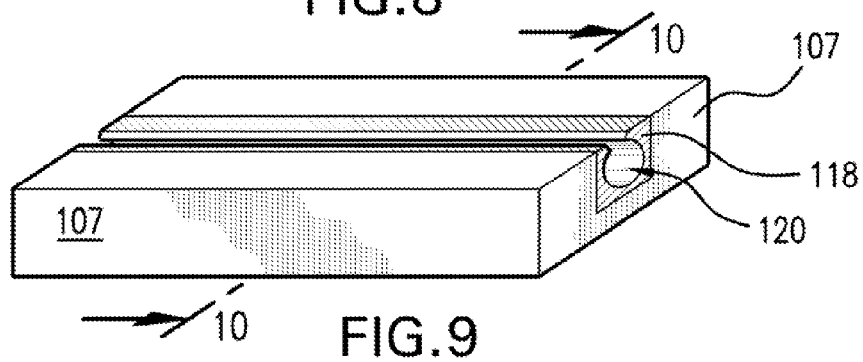
FIG. 9 is an elevated view of a portion of the dispenser barrel of the dispenser of FIG. 6.
Figure 10:
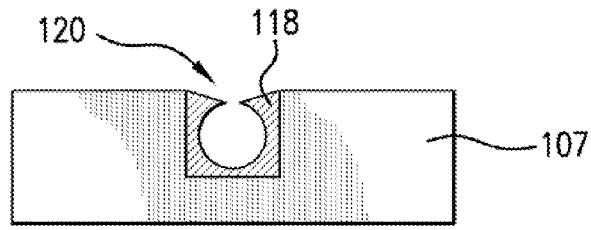
FIG. 10 is a cross-sectional view of the portion of the dispenser barrel of FIG. 9 taken along line 10-10.
Figure 12:
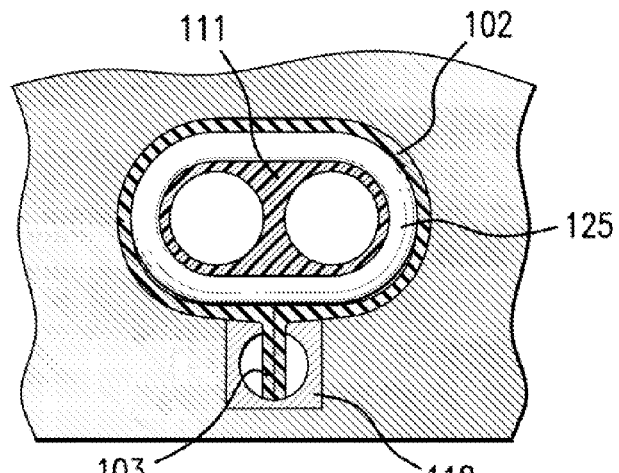
FIG. 12 is a cross-sectional view of the dispenser barrel of FIG. 8 taken along line 12-12.

FIG. 6 presents yet another embodiment of a dispenser 100 employing a formed-in-place reaction tube. To aid in the understanding of this embodiment, reference is also made to FIGS. 6A, 8, 9, 10 and 12. FIG. 6A depicts a top view of the forward end of the dispenser of FIG. 6. FIG. 8 depicts that portion of the dispenser where the materials feed tubes 110 enter into the interior of the formed-in-place reaction tube 101. FIG. 9 depicts an elevated view of that portion of the dispenser body 107 corresponding to the lower portion of the dispenser barrel 105 forward of the point where the materials feed tubes 110 enter the reaction tube. FIG. 12 corresponds to the cross-sectional view of that portion of the dispenser shown in FIG. 8 along line 12-12.

In this particular embodiment, the formed-in-place reaction tube 101 is actually a re-sealable tube stock material; preferably of the type described above in relation to the stock used to manufacture "Zip-Loc" brand type storage bags. This tube stock, a cross-sectional view of which is shown in FIG. 12, comprises a tube wall 102 and, extending from the tube wall and along its full length, a mechanical locking or closure tab means 103. Preferably, the diameter of the tube defined by the tube wall 102 is the same as or nearly the same as the inner diameter of the dispenser barrel 105. To accommodate the closure tab means 103, the dispenser barrel includes at least one channel 120 in the wall of the dispenser barrel extending lengthwise along the dispenser barrel from the point where the tube stock first enters the dispenser barrel to the dispenser outlet. As will be discussed below, this channel bifurcates as one approaches the point where the feed tubes 110 enter into the dispenser barrel, one channel fading to the left and the other fading to the right so as to allow entry of the feed tube into the interior or the reaction tube, and then the two channels re-combine on the other side of that entry point. From the point where the two channels recombine, the channel will include as an insert or its walls will be configured to form a closure bias means 118, preferably a "C" clamp type means, that acts upon and maintains the closure tab means 103 of the reaction tube 101 in a closed or sealed relationship. FIG. 11 presents an alternate configuration of the "C"clamp wherein the "C" clamp is made of a somewhat resilient material wherein the opposing prong ends 123 of the clamp are normally biased so as to touch one another, or nearly so, such that the gap 122, in the normal resting position without the reaction tube in place is non-existent or is very narrow, certainly more narrow than the thickness of the closure tab means 103 of the reaction tube. With this configuration, a constant bias or pressure is exerted upon the closure tab means 103 when the reaction tube is in place. In the "C" clamp of FIG. 10, the gap is substantially constant and set to form a slight interference fit with the closure tab means 103 of the reaction tube 101. The closure bias means 118 or a similar means may also be present in the channel rearward of the point where the channel bifurcates so as to help keep the reaction tube stock properly aligned within that portion of the dispenser barrel.

As mentioned above, in order to accommodate the feed tubes 110, it is necessary to open the tube stock 101. As shown in FIGS. 6A and 8, this is achieved by pin 106, which is embedded in the dispenser body 107 at the point where the channel 120 bifurcates. Upon encountering the pin 106, the closure tab means 103 are opened with each opposing edge of the closure tab means following one of the two bifurcated channels, thereby opening the sidewall of the reaction tube to allow entry of the feed tubes 110. As seen in FIG. 8, elements 108 depict the cross-section of that bifurcated channel coming out of the figure immediately to the left of the pin 106, passing in front of the feed tubes 110 and then re-entering the figure to the right of the point where the feed tubes 110 have entered the reaction tube 101. This is more clearly shown in FIG. 6A, where the pin 106 is shown to open the closure tab means 103 of the reaction tube 101, with each edge of the closure tab means passing on opposite sides of the feed tubes 110 and then turning under the manifold 111, the forward end of the feed tubes 110, where they merge (not shown). As a point of clarification, it is to be noted that the image of the reaction tube in FIG. 8 is shown partially cut away so as to expose the elements that extend up into the interior of the reaction tube. On the other hand, in FIGS. 6 and 6A, one is looking through the wall 102 of the reaction tube at those same elements.

The materials to be dispensed by the dispenser are fed into the reaction tube 101 by feed tubes 110. As shown in FIG. 8, feed tubes 110 pass through a bore 109 in the dispenser body wall 107 and then turn 90 degrees towards the fore end of the dispenser 113 and extend into the interior of the reformed reaction tube 101. The fore end of the feed tubes 110 forms or ends at a manifold 111 having a plurality of orifices from which the materials are expelled into the reaction tube. As shown in FIGS. 8 and 12, an O ring or like seal element 125 encircles the outer circumference of the manifold and forms a liquid tight seal against the inner wall 102 of the reaction tube. In essence, the wall of the reaction tube 102 is pinched or held by an interference fit between the O ring 125 and the inner wall of the dispenser barrel. This prevents liquid materials being dispensed from the manifold from passing in back of the O ring.

In this particular embodiment, the mixing of the materials to be dispensed is accomplished by the action of an impeller wheel 130 upon the outer wall 102 of the reaction tube 101. Specifically, the paddles 132 of the impeller press down on the wall of the reaction tube creating flow and shear of the liquid materials within the reaction tube. The impeller wheel 130 may be composed of a rigid material, e.g., a metal, a rigid resin or plastic, etc., or a somewhat flexible or elastomeric material, e.g., a flexible polymer, an elastomer, a rubber, etc. The impeller wheel 130 may be rotated manually or, preferably, by a motor or other like means (not shown) that connects to or impacts upon the axle 135 of the impeller wheel. Preferably, the impeller wheel is retractable so as to facilitate the initial feed of the reaction tube stock through the dispenser barrel. Having a retractable impeller wheel also makes it possible to regulate the extent to which the impeller impinges upon the reaction tube so as to increase or decrease the amount of shear created by the action of the impeller wheel on the flow of materials within the reaction tube. In one application, particularly where the impeller is made of a flexible or elastomeric material, the impeller may be fully extended so that the outer edge of the impeller paddles 132 causes the complete or nearly complete collapse of the reaction tube against the opposing wall of the dispenser barrel. In this orientation, the impeller serves not only as a mixer means but as a control means, controlling the dispensing of the materials from the dispenser. When the impeller wheel stops, flow through the reaction tube is stopped as well. Similarly, one may adjust or regulate the amount and/or rate of material to be dispensed by controlling the rotation of the impeller wheel.

Although the action of the impeller wheel is believed to be sufficient for proper mixing of the materials within the reaction tube, it may be desirable, especially for highly viscous materials, to employ additional mixer means. One such alternate embodiment is shown in FIG. 7 where a roller means 137 impinges upon and reciprocates across the reaction tube wall 102. Reciprocation of the roller means 137 is effected by a motor or like means (not shown). Preferably, the roller means 137, like the impeller wheel 130, is retractable or is capable of being swung out of the reaction tube pathway so as to facilitate the initial set up of the dispenser and to regulate the extent to which the roller means compresses the reaction tube. Additionally, as shown in FIG. 7, the roller means 137 has a plurality of ribs 139. The presence of the ribs increases the shear within the materials in the reaction tube by forcing the liquids in multiple directions corresponding to the contours of the surface of the ribs.

Finally, as shown in FIG. 6, the dispenser, optionally, though preferably, includes a nozzle 140 attached to the fore end 113 of the dispenser body 107 such that the inner volume of the dispenser barrel 105 is substantially continuous with the inner volume of the nozzle. As discussed with the previous embodiments, the nozzle element may take any number of shapes and configurations, the selection of which is largely dependent upon the shape and size of the bead of material to be dispensed and whether and/or how the closure tab means 103 of the reaction tube 101 is to be accommodated. For example, as discussed below, the inner shape of the nozzle may be such as to promote the rolling or folding over of the tube wall upon itself or the inner surface of the nozzle may include guide means extending from the surface thereof into the chamber defined by the nozzle to effect or facilitate this rolling or folding over of the tube wall 102. Alternatively, the nozzle may have a key hole shaped cross-section and a slot running along one wall of the nozzle that allows the closure tab means 103 to run along the outside of the nozzle element as the reaction tube is fed into and through the nozzle.

FIGS. 6 and 6A depict a nozzle element 140 that is conical in shape, having a threaded end portion 144 that is threadingly engaged with the fore end 113 of the dispenser barrel 105. As shown in FIG. 13, which is a cross-sectional view of the nozzle of FIG. 6A taken along line 13-13, in this particular embodiment the reaction tube 101 extends through the orifice of the nozzle with a portion 114 of the reaction tube wall 102 being rolled or folded over on itself. Smaller and smaller orifices can be accommodated by a progressively increasing the extent to which the reaction tube wall is rolled or folded over. With this nozzle type, the channel at the fore end of the dispenser barrel gradually becomes shallower and turns to one side to initiate and promote the rolling or folding over of the reaction tube wall 102 on itself. As indicated in FIG. 13, that portion 114 of the reaction tube wall 102 that is folded over and the closure tab means 103 are compressed against the inner wall 146 of the nozzle 140 by the contents within the reaction tube. This orientation relieves or at least lessens the pressure on the closure tab means so that concern of the closure tab means opening or leaking is avoided.

While this particular embodiment has a threaded end that is screwed into the interior or the dispenser barrel, the connector means could be one that threads to the exterior of the dispenser barrel or is not threaded at all but is connected by a snap-fit mechanism or other male-female connection. In these embodiments, the channel within the dispenser barrel could be aligned with a channel or guide means on the interior surface of the nozzle which becomes shallow and turns so as, again, to promote or facilitate further the rolling or folding over of the reaction tube wall.

A second configuration for the nozzle element is a keyhole shaped nozzle 150 as shown in FIGS. 14 and 15. In this case the nozzle element has a slot 155 extending the length of the nozzle element that, in use, is aligned with the channel 120 at the fore end 113 of the dispenser barrel so that the closure tab means 103 of the reaction tube 101 rides in or just below the opposing edges 158 and 159 of the nozzle body 156 at the slot 155. The width of the slot 155 through the wall of the nozzle body 156 at the opposing edges 158 and 159 should be so narrow as to create an interference fit with the reaction tube wall held therein 164. This interference fit ensures no leakage of the materials within the reaction tube through the seam of the closure tab means 103.

This nozzle body 156 has two shaping regions, an upper region 162 which is substantially conical in shape and a lower region 163 which begins as a shallow, wide trough-like shape and ends, at the orifice, as a deep narrow trough. These two regions acting in unison cause a gradual collapse and/or re-shaping of the cross-section of the reaction tube wall so as to form the desired orifice 154. In the embodiment shown in FIG. 14, the nozzle transforms the flow path within the reaction tube from a broad circular or oval shape to a small, circular shape at the orifice 154; thereby enabling the dispensing of the materials in a narrow bead. In use, the end of the reaction tube 101 will extend just beyond the nozzle orifice. As mentioned, although these figures depict a circular orifice, one can shape the orifice in any number of ways so as to apply or dispense a bead of various dimensions. For example, the orifice may be of a narrow elongated shape so as dispense a wide thin bead of material or of a teardrop shape so as to dispense a bead that would have a substantially tear-drop or triangular cross section. The key is that the opposing edges 158 and 159 of the nozzle body 156 at the slot 155 create an interference fit with the walls 102 of the reaction tube 101 so as to prevent any leakage of material though the seam and that the side walls 160 and 161 of the lower region 163 of the nozzle body 156 sufficiently compress the walls of the reaction tube 101 in the lower region so as to prevent flow of the materials from the fore end of the reaction tube from other than that portion at or extending through the orifice 154.

In FIG. 14, the nozzle is shown to include an annular flange or extension 152 which sits in a recess in the fore end 113 of the dispenser body 107 and is detachably connected/attached thereto. Attachment may be by way of a snap-fit means, a screw or pin means, a turn lock mechanism, or the like. Additionally, either the annular flange 152 of the nozzle or the corresponding recess of the dispenser body 107 may have a key that rides in a corresponding track or channel in the other which ensures the proper alignment of the channel 120 of the dispenser barrel with the slot of the nozzle.

Turning back to the dispenser of FIGS. 6 and 6A, in preparing the dispenser for its initial operation, reaction tube stock is fed from a supply, typically a roll 104 of the flattened reaction tube stock, into the aft end of the dispenser barrel. To help guide the tube stock in the dispenser barrel 105, the closure tab means 103 is fed into channel 120 of the dispenser barrel. As the end of the reaction tube stock approaches pin 106, the seam of the reaction tube is opened and each edge of the reaction tube is fed through the opposing channels on each side of the materials feed tubes 110. Once the end of the reaction tube stock passes the entry point of the feed tubes, the separated edges of the reaction tube are once again mated when the two opposing channels merge to once again form a single channel which is configured to include or contain, as a separate insert, a closure biasing means 118. The closure biasing means 118 presses the two edges of the closure tab means 103 to reform the liquid tight seam. The end of the reformed reaction tube is then fed past the manifold 111 and O ring 125 and through the full length of the dispenser barrel 105 to the nozzle 140. As shown in FIG. 6A, the reaction tube extends just beyond the orifice 142 of the nozzle.

In charging the dispenser with the materials to be mixed and dispensed, the components are fed into the inner volume of the reaction tube 101 forward of the manifold 111 and O ring 125 via feed tubes 110 and the manifold 111. Feed tubes 110 are detachably connected to supply lines from the source of the materials to be dispensed (not shown). Typically, the supply lines are connected to pressurized containers of the materials to be dispensed: flow of the materials within the supply lines or feed tubes may be controlled by an actuator means, valve means, or other flow control means known in the art. Such means may be intermediate the supply and the dispenser or integrated into the dispenser itself. Furthermore, since not all two or more component compositions require 1:1 ratios, one may accommodate such varied feed ratios by employing different flow rates for the material and/or feed tubes and/or manifold orifices of different cross-sectional areas.

As materials begin to exit the manifold 110 at its fore face 112 and fill the inner volume of the reaction tube, the mixer means, the impeller wheel 130 in the case of FIG. 6, if not already in place, is advanced to the desired point such that the paddles 132 of the impeller 130 press down on the outer wall 102 of the reaction tube causing the reaction tube to partially or fully collapse. The impeller wheel is rotated counterclockwise so as to enhance the mixing of the materials within the reaction tube and to advance or help advance the materials in the reaction tube towards the nozzle. Alternatively, if the impeller wheel is only partially advanced against the reaction tube, the impeller wheel may be rotated in a clockwise fashion to as to created additional shear and flow of materials within the reaction tube. However, the backflow pressure caused by this clockwise rotation should be less than the pressure at which the materials are fed into the reaction tube so as to avoid any backflow into the manifold and feed tubes. Finally, the mixed materials are then dispensed from the end of the reaction tube extending through the orifice of the nozzle.

During operation of the dispenser, if the flow rate through the dispenser is adversely affected due to clogging or partial clogging of the reaction tube or to a substantial thickening or a high viscosity increase of the reactive materials resulting from the cure or partial cure and/or cross-linking or polymerization of the materials within the reaction tube, the impeller wheel is retracted and a length of the reaction tube corresponding to the length of the dispenser barrel 105 from the O ring to the nozzle orifice, or longer, if desired, is extracted through the orifice of the nozzle or, especially in extreme cases, from the dispenser barrel following removal of the nozzle. The soiled reaction tube is then cut and disposed of:

thereby leaving a section of new reaction tube in the dispenser barrel. This process may be repeated over and over without the need for complete disassembly of the dispenser for so long as there remains sufficient reaction tube stock in the supply 104. Thereafter, the dispenser is placed back into operation.

When it is desired to change the materials, one may do so on the run without having to disassemble and clean the dispenser apparatus. In this situation, one may merely disconnect the feed tubes and reconnect them to the supply lines of the new materials. The new materials are fed into the dispenser, forcing out and replacing the prior materials in the feed tubes, manifold and reaction tube. Once the new materials begin to exit from the reaction tube, the reaction tube is advanced or pulled through the dispenser barrel, as described above, until the full length of the reaction tube that was soiled with the original materials is extracted. Again, the reaction tube is cut and dispensing of the new materials is commenced. In those situations where there is concern for reactivity of the new materials with the prior materials being dispensed, it may be necessary and prudent to first purge the system with a non-reactive material with one or two advances of the reaction tube. In the former, the reaction tube is advanced and changed out once the non-reactive purge material begins to exit the dispenser and the feed tubes are switch to the new reactive materials. Once the purge material is expelled, the dispenser is put into dispense mode for the new reactive materials. Alternatively, one may do a second reaction tube advance and change out once the non-reactive purge materials are expelled so as to ensure that the inner wall of the reaction tube is free of the purge material. While the purge has been described with respect to a full purging before changing to the new materials to be dispensed, one could also merely inject the purge materials into the supply and/or feed lines for a short period time to isolate the old materials from the new materials as they both flow through the dispenser system.

Finally, when it comes time to discontinue the use of the dispenser, the present invention enables its cleaning for storage without full disassembly. This process is similar to that employed in doing the changeover to a second reactive material except that one only employs a cleaning solution to purge the system. Once, or shortly after, the cleaning solution begins to run out of the dispenser, the reaction tube is advanced to introduce clean reaction tube into the dispenser barrel and the soiled portion is cut and disposed of. Cleaning fluid is then allowed to continue to run through the system for a brief period so as to ensure that the face of the manifold is also cleaned of any, or at least most, residual reactive materials. Thereafter, the dispenser may be drained and stored for future use.

Although the various embodiments discussed above have been presented with the sense of a dispenser barrel defined by elements of the dispenser body, such is not necessary. Specifically, if the polymeric materials from which the reaction tube or tube stock is made does not yield under the conditions of use, a full circumferential or cylindrical dispenser barrel is not necessary so long as the dispenser includes a backstop opposite the mixer means so as to ensure deformation of the reaction tube by the mixer means. So as to avoid concern of possible leakage past the O ring or seal along the manifold, one may merely employ a cylindrical ring encircling the O right or seal so as to ensure a tight or slight interference fit of the reaction tube wall between the O ring or seal and the cylindrical ring. Thus, the elements of the dispenser of the present invention may be arranged and situated on a frame or they may be integrated into a dispenser housing. Where the dispenser includes a dispenser body, especially one that defines a dispenser barrel, the body is preferably comprised of a number of interlocking or connectable elements or parts so that one may disassemble the same and, in particular, gain access to the inner elements of the dispenser for cleaning, if necessary, and/or replacement of the operative parts of the dispenser as well as for ease of replacing the reaction tube stock and feeding the tube stock through the dispenser.

Although the foregoing discussion has been with respect to the use of the inventive dispenser in the dispensing of curable compositions, and while the present invention is certainly most beneficial and applicable to such systems, it may also be used in the dispensing of other multipart compositions as well. Such other compositions may be reactive or non-reactive. For example, the dispenser of the present invention may be used in dispensing multi-component systems that react in ways other than or in addition to those that increase viscosity or solidify, e.g., those that react to form a foam. Alternatively, the dispenser may be used to mix compositions that contain constituents that react to form an active agent for the intended use of the composition, e.g., a biocide. The latter is especially beneficial if the formed active agent has a defined life since the reactive constituents are separated from each other during storage and transport of the materials with mixing occurring only at the intended time of use. Similarly, it may be desirable to keep certain components away from each other until the time of use so as to prevent one from deactivating or reacting with each other. Specifically, one component of a two-part sealant composition may include an active agent that acts as a rust inhibitor when applied to metal surfaces. The other component of the two-part system may include a metal salt that slowly reacts with the active agent of the first component. Clearly, to optimize the rust inhibitory properties of the sealant, it is necessary to isolate the two parts from one another until the time of use or application. Finally, the inventive dispenser may be used for mixing and dispensing non-reactive constituents wherein one is simply looking for an apparatus that has a greatly simplified and expedient cleaning regiment as compared to traditional dispensers that do not incorporate the reaction tube so as to isolate the various components of the dispenser form the materials to be dispensed.

While the present invention has been described with respect to specific embodiments and features, it should be appreciated that other embodiments utilizing the concept of the present invention are possible without departing from the scope of the invention. For example, any of the herein described reaction tubes could be employed with any of the mixer means and/or nozzle elements. The specific constructions depicted in Figures are merely representative. Accordingly, the present invention is defined by the claimed elements and any and all modifications, variations, or equivalents that fall within the spirit and scope of the underlying principles.

We claim:

1. A dispenser suitable for mixing and dispensing a two- or more-part curable composition comprising:
   a) a dispenser body having a fore end and an aft portion;
   b) a manifold integrated into and supported by the dispenser body and having (i) an aft end having a plurality of manifold inlets defining the point of entry of the components to be mixed into the manifold, at least one for each part of the composition to be mixed, (ii) a generally cylindrical fore region ending at a fore end, which fore end comprises a fore face having a plurality of manifold outlets, (iii) a central region defined by a plurality of channels through the manifold, each channel in fluid communication with a manifold inlet and at least one manifold outlet and (iv) a recess adapted to hold a portion of a reaction tubing such that at least a portion of the manifold is within the lumen of the reaction tubing when in place, said recess being either (I) an annular recess in the fore end of the manifold adapted to receive and sealingly engage a butt end of a reaction tube said annular recess comprising either (A) an annular recess having two side walls in the fore face of the manifold wherein the width of the recess, as defined by the distance from one side wall to the other, being such as to create an interference fit between the wall of a reaction tube and the side walls of the annular recess or (B) an indent in the outer circumferential wall of the fore end of the manifold whereby the whole of the fore face of the manifold is circumscribed by the indent such that a reaction tube, when placed therein is secured in place by an interference or press fit between the outer circumference of the manifold at the indent and the inner wall of the barrel of the dispenser body or (II) a circumferential recess about the central region of the manifold and the dispenser further comprises a circumferential seal means extending from the outer surface of the manifold intermediate the circumferential recess and the fore end of the manifold;

c) a dispenser outlet associated with the fore end of the dispenser body;

d) a mixer means integrated into and supported by the dispenser body and intermediate said manifold and said dispenser outlet; and e) a reaction tube pathway extending from the recess to the dispenser outlet and defining a flow path from the outlets in the fore face of the manifold to the dispenser outlet.

2. The dispenser of claim 1 wherein the recess comprises an annular recess in the fore face of the manifold.

3. The dispenser of claim 2 further comprises a segment of reaction tubing extending from the annular recess and along the reaction tubing pathway.

4. The dispenser of claim 1 wherein the annular recess comprises an indent in the outer circumferential wall of the fore end of the manifold.

5. The dispenser of claim 4 further comprising a segment of reaction tubing extending from the annular recess and along the reaction tubing pathway and wherein the whole of the fore face lies in the lumen of the reaction tubing.

6. The dispenser of claim 1 wherein the recess comprises a circumferential recess about the center region of the manifold and the dispenser further comprises a circumferential seal means intermediate the circumferential recess and the fore end of the manifold.

7. The dispenser of claim 6 wherein the seal means is adapted to provide a liquid tight, interference fit with the internal surface of a reaction tube stock.

8. The dispenser of claim 6 further comprising a defined, continuous length of reaction tube stock in the circumferential recess whereby at least a portion of the central region of the manifold at the circumferential recess lies within the lumen of the reaction tubing.

9. The dispenser of claim 8 wherein the length of the reaction tube stock is limited by the holding capacity of the circumferential recess.

10. The dispenser of claim 8 wherein one end of the reaction tubing extends from the reservoir along the reaction tubing pathway and the seal means forms a liquid tight seal with the inner wall of the reaction tubing.

11. The dispenser of claim 8 wherein the dispenser is adapted to allow for the reaction tubing to be pulled along the reaction tube pathway and out of the dispenser outlet.

12. The dispenser of claim 8 wherein the reaction tubing is scored or serrated so as to allow for easy excision of the used tubing from the newly exposed tubing as the used tubing is pulled from the dispenser.

13. The dispenser of claim 1 wherein one or more of the channels within the manifold is split into two or more subchannels, each of which is in fluid communication with an outlet on the fore face of the manifold.

14. The dispenser of claim 1 further comprising a dispenser nozzle defining a nozzle barrel having an inlet end associated with the dispenser outlet and an outlet comprising a nozzle orifice, wherein the flow path through the nozzle is narrowed or reshaped.

15. The dispenser of claim 14 wherein the inlet end of the dispenser nozzle is configured to fit within the orifice of the dispenser outlet.

16. The dispenser of claim 15 wherein the inlet end of the dispenser includes an end portion whose dimensions are less than the inner circumference of the dispenser outlet such that the inlet end of the nozzle is adapted to fit within the lumen of a reaction tubing and create a liquid tight seal when reaction tubing is sandwiched between the inlet end of the nozzle and the inner wall of the dispenser outlet.

17. The dispenser of claim 1 further comprising a dispenser nozzle having a tapered upper region ending in a defined orifice and a tapered trough-like lower region ending in a slot, the slot extending from the dispenser outlet to the nozzle orifice, the nozzle adapted to accept the passing through of a reaction tubing such that the narrowing of the trough of the lower region creates an interference fit with the collapsed walls of that portion of reaction tubing passing therethrough at the slot.

18. The dispenser of claim 1 wherein the mixer means comprises a mixer barrel having an interior surface with a plurality of protruding features or projections extending into the channel of the barrel, which features cause a diversion of the flow of materials through the flow path.

19. The dispenser of claim 17 wherein the protruding features are selected from the group consisting of ribs, waves, screw-like threads, and mounds.

20. The dispenser of claim 1 wherein the mixer means comprises a dynamic mixer through which or past which the reaction tube pathway traverses, said dynamic mixer having one or more elements adapted to create multidirectional flow in the flow path of the reaction tube pathway by impacting upon the exterior wall of a reaction tubing in the reaction tube pathway.

21. The dispenser of claim 20 further comprising reaction tubing extending along the reaction tube pathway.

22. The dispenser of claim 20 wherein the mixer is a dynamic mixer selected from the group consisting of a single compressor element; a plurality of compressor elements aligned along the flow path; a peristaltic type means; a roller element reciprocating back and forth along a length of the fluid pathway, transverse to the fluid pathway or both; an impeller wheel having a plurality of impeller paddles; or a combination of any two or more of the foregoing.

23. The dispenser of claim 1 wherein the mixer is a dynamic mixer comprising a plurality of compressor elements aligned along the flow path.

* * * * *